US 012587624B2

(12) United States Patent
Xiong

(10) Patent No.: US 12,587,624 B2
(45) Date of Patent: Mar. 24, 2026

(54) FINAL VIEW GENERATION USING OFFSET AND/OR ANGLED SEE-THROUGH CAMERAS IN VIDEO SEE-THROUGH (VST) EXTENDED REALITY (XR)

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 18/664,097

(22) Filed: May 14, 2024

(65) Prior Publication Data

US 2025/0150566 A1 May 8, 2025

Related U.S. Application Data

(60) Provisional application No. 63/596,549, filed on Nov. 6, 2023.

(51) Int. Cl.
H04N 13/117 (2018.01)
H04N 13/344 (2018.01)

(52) U.S. Cl.
CPC ......... H04N 13/117 (2018.05); H04N 13/344 (2018.05)

(58) Field of Classification Search
CPC ........................... H04N 13/117; H04N 13/344
USPC ........................................................... 348/47
See application file for complete search history.

(56) References Cited

U.S. PATENT DOCUMENTS

| | | | |
|---|---|---|---|
| 9,311,883 B2 | 4/2016 | Cajigas et al. | |
| 11,386,600 B2 * | 7/2022 | Joo ........................... | G06F 3/14 |
| 11,627,303 B2 | 4/2023 | Lee | |
| 2010/0045783 A1 | 2/2010 | State et al. | |
| 2016/0012643 A1 * | 1/2016 | Kezele ................. | H04N 13/344 |
| | | | 345/633 |

(Continued)

FOREIGN PATENT DOCUMENTS

CN        107016729 A        8/2017

OTHER PUBLICATIONS

International Search Report and Written Opinion of the International Searching Authority dated Oct. 11, 2024 in connection with International Patent Application No. PCT/KR2024/009127, 9 pages.

*Primary Examiner* — Tung T Vo

(57) ABSTRACT

A method includes identifying a passthrough transformation associated with a VST XR device. The VST XR device includes see-through cameras that are (i) offset from forward axes extending from expected locations of a user's eyes and/or (ii) rotated such that optical axes of the see-through cameras are angled relative to the forward axes. The method also includes obtaining images captured using the see-through cameras, applying the passthrough transformation to the images to generate transformed images, and displaying the transformed images on one or more display panels of the VST XR device. The passthrough transformation is based on (i) a first transformation between see-through camera viewpoints and viewpoint-matched virtual camera viewpoints and (ii) a second transformation that aligns principal points of the see-through cameras and principal points of the one or more display panels.

20 Claims, 30 Drawing Sheets

(56) References Cited

U.S. PATENT DOCUMENTS

| | | | |
|---|---|---|---|
| 2018/0205963 A1* | 7/2018 | Matei | H04N 21/85406 |
| 2019/0285895 A1* | 9/2019 | Fujimaki | H04N 13/332 |
| 2020/0041799 A1 | 2/2020 | Zhu et al. | |
| 2020/0103669 A1* | 4/2020 | Hennigan | H04N 23/55 |
| 2020/0258316 A1 | 8/2020 | Lee | |
| 2020/0357165 A1* | 11/2020 | Dixit | G06T 19/006 |
| 2020/0374509 A1 | 11/2020 | Sullivan et al. | |
| 2021/0022599 A1 | 1/2021 | Freeman et al. | |
| 2021/0109352 A1 | 4/2021 | Lee et al. | |
| 2021/0160440 A1 | 5/2021 | Bleyer et al. | |
| 2021/0233312 A1* | 7/2021 | Noris | H04N 13/279 |
| 2021/0255462 A1* | 8/2021 | Cooper | G06F 3/011 |
| 2022/0035160 A1* | 2/2022 | Bedard | G02B 3/0062 |
| 2022/0159196 A1 | 5/2022 | Lee | |
| 2023/0237703 A1 | 7/2023 | Ma | |

* cited by examiner

FINAL VIEW GENERATION USING OFFSET AND/OR ANGLED SEE-THROUGH CAMERAS IN VIDEO SEE-THROUGH (VST) EXTENDED REALITY (XR)

CROSS-REFERENCE TO RELATED APPLICATION AND PRIORITY CLAIM

This application claims priority under 35 U.S.C. § 119(e) to U.S. Provisional Patent Application No. 63/596,549 filed on Nov. 6, 2023. This provisional patent application is hereby incorporated by reference in its entirety.

TECHNICAL FIELD

This disclosure relates generally to extended reality (XR) systems and processes. More specifically, this disclosure relates to final view generation using offset and/or angled see-through cameras in video see-through (VST) XR.

BACKGROUND

Extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

SUMMARY

This disclosure relates to final view generation using offset and/or angled see-through cameras in video see-through (VST) extended reality (XR).

In a first embodiment, a method includes identifying a passthrough transformation associated with a VST XR device. The VST XR device includes see-through cameras that are at least one of (i) offset from forward axes extending from expected locations of a user's eyes when using the VST XR device or (ii) rotated such that optical axes of the see-through cameras are angled relative to the forward axes. The method also includes obtaining images of a scene captured using the see-through cameras, applying the passthrough transformation to the images in order to generate transformed images, and displaying the transformed images on one or more display panels of the VST XR device. The passthrough transformation is based on (i) a first transformation between see-through camera viewpoints and viewpoint-matched virtual camera viewpoints and (ii) a second transformation that aligns principal points of the see-through cameras and principal points of the one or more display panels.

In a second embodiment, a VST XR device includes see-through cameras configured to capture images of a scene. The see-through cameras are at least one of (i) offset from forward axes extending from expected locations of a user's eyes when using the VST XR device or (ii) rotated such that optical axes of the see-through cameras are angled relative to the forward axes. The VST XR device also includes one or more display panels. The VST XR device further includes at least one processing device configured to identify a passthrough transformation associated with the VST XR device, apply the passthrough transformation to the images in order to generate transformed images, and initiate display of the transformed images on the one or more display panels. The passthrough transformation is based on (i) a first transformation between see-through camera viewpoints and viewpoint-matched virtual camera viewpoints and (ii) a second transformation that aligns principal points of the see-through cameras and principal points of the one or more display panels.

In a third embodiment, a non-transitory machine readable medium contains instructions that when executed cause at least one processor of a VST XR device to identify a passthrough transformation associated with the VST XR device. The VST XR device includes see-through cameras that are at least one of (i) offset from forward axes extending from expected locations of a user's eyes when using the VST XR device or (ii) rotated such that optical axes of the see-through cameras are angled relative to the forward axes. The non-transitory machine readable medium also contains instructions that when executed cause the at least one processor obtain images of a scene captured using the see-through cameras, apply the passthrough transformation to the images in order to generate transformed images, and initiate display of the transformed images on one or more display panels of the VST XR device. The passthrough transformation is based on (i) a first transformation between see-through camera viewpoints and viewpoint-matched virtual camera viewpoints and (ii) a second transformation that aligns principal points of the see-through cameras and principal points of the one or more display panels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
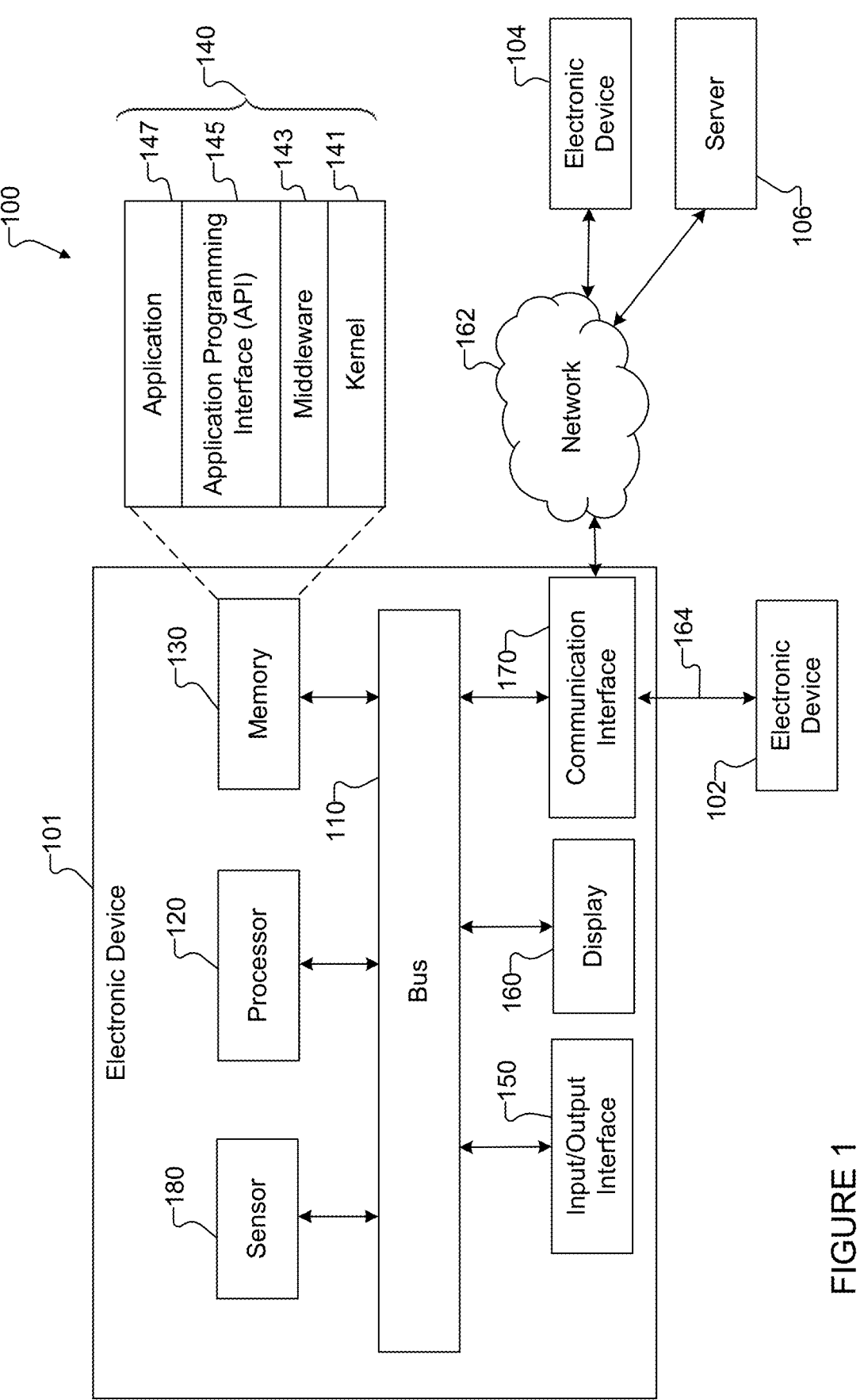
FIG. 1 illustrates an example network configuration including an electronic device in accordance with this disclosure.

FIGS. 1 through 22, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

Optical see-through (OST) XR systems refer to XR systems in which users directly view real-world scenes through head-mounted devices (HMDs). Unfortunately, OST XR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements. In contrast to OST XR systems, video see-through (VST) XR systems (also called "passthrough" XR systems) present users with generated video sequences of real-world scenes. VST XR systems can be built using virtual reality (VR) technologies and can have various advantages over OST XR systems. For example, VST XR systems can provide wider fields of view and can provide improved contextual augmented reality.

VST XR devices typically use see-through cameras to capture images of their surrounding environments. The see-through cameras of a VST XR device are positioned at locations away from a user's eyes, so transformations can be performed to transform the images captured at the see-through cameras' locations into virtual images that appear to be captured at the locations of the user's eyes. However, it is generally assumed that the see-through cameras are positioned directly in front of the user's eyes and are pointing straight ahead. Unfortunately, this limits the configuration of the VST XR devices.

This disclosure provides various techniques supporting final view generation using offset and/or angled see-through cameras in VST XR. As described in more detail below, a passthrough transformation associated with a VST XR device can be identified. The VST XR device includes see-through cameras that are at least one of (i) offset from forward axes extending from expected locations of a user's eyes when using the VST XR device or (ii) rotated such that optical axes of the see-through cameras are angled relative to the forward axes. Images of a scene can be captured using the see-through cameras, and the passthrough transformation can be applied to the images in order to generate transformed images. The transformed images can be displayed on one or more display panels of the VST XR device. The passthrough transformation is based on (i) a first transformation between see-through camera viewpoints and viewpoint-matched virtual camera viewpoints and (ii) a second transformation that aligns principal points of the see-through cameras and principal points of the one or more display panels. In some embodiments, the passthrough transformation is further based on (iii) a rectification to map image frames of the viewpoint-matched virtual cameras to image frames of virtual rendering cameras. In some cases, the first transformation may be based on an interpupillary distance associated with the expected locations of the user's eyes. Also, in some cases, the transformed images may provide a different field of view than a field of view at the expected locations of the user's eyes, such as a wider field of view.

In this way, these techniques support the generation of final views for a VST XR device, which can be accomplished using see-through cameras that are offset and/or angled relative to the forward axes extending from the expected locations of the user's eyes. As a result, these techniques allow for different configurations and layouts of VST XR devices while supporting algorithms that efficiently transform see-through images captured at see-through camera viewpoints into virtual images that appear to be captured at the user's eye viewpoints. Thus, for instance, VST XR devices in which the see-through cameras are positioned above, below, outward, or inward of the forward axes and/or in which the see-through cameras are angled outward, inward, downward, or upward relative to the forward axes can be used. Regardless of the configuration, the disclosed techniques can efficiently transform images captured using the see-through cameras. Moreover, the transformations can be used to obtain high performance and generate high-quality virtual images for presentation to the user.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform one or more functions related to final view generation using offset and/or angled see-through cameras in VST XR.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform final view generation using offset and/or angled see-through cameras in VST XR. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include cameras or other imaging sensors, which may be used to capture images of scenes. The sensor(s) 180 can also include one or more buttons for touch input, one or more microphones, a depth sensor, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to final view generation using offset and/or angled see-through cameras in VST XR.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIGS. 2A through 2G illustrate example configurations 200a-200g of see-through cameras in a VST XR device in accordance with this disclosure. For ease of explanation, the configurations 200a-200g shown in FIGS. 2A through 2G are described as being used in the electronic device 101 in the network configuration 100 of FIG. 1. However, the configurations 200a-200g of see-through cameras shown in FIGS. 2A through 2G may be used with any other suitable device(s) and in any other suitable system(s). Also, VST XR devices may have other configurations of see-through cameras not specifically illustrated here.

As shown in FIGS. 2A through 2G, each of the configurations 200a-200g includes left and right see-through cameras 202a-202b, which can be used to capture images of a scene. The see-through cameras 202a-202b may, for example, represent imaging sensors 180 of the electronic device 101. Each of the see-through cameras 202a-202b can be used to capture see-through images, which represent images that capture the scene from the viewpoints of the see-through cameras 202a-202b. The see-through images can be transformed as described below to generate virtual images that are presented to left and right eyes 204a-204b of a user. The transformations cause the virtual images to appear as if they were captured at viewpoints of virtual cameras positioned at the user's eyes 204a-204b.

The user's eyes 204a-204b are respectively associated with forward axes 206a-206b. Each forward axis 206a-206b represents an axis extending forward from an expected location of the associated eye 204a-204b of the user when the user is using the VST XR device. In general, the design of the VST XR device determines where the expected locations of the user's eyes 204a-204b are positioned. In some cases, the VST XR device is adjustable (either manually or automatically) to accommodate different inter-pupillary distances (IPDs) between the user's eyes 204a-204b, and the expected locations of the user's eyes 204a-204b can vary based on the current inter-pupillary distance being used. The see-through cameras 202a-202b are respectively associated with optical axes 208a-208b. Each optical axis 208a-208b defines the axis along which the associated see-through camera 202a-202b images a scene.

Figure 2A:
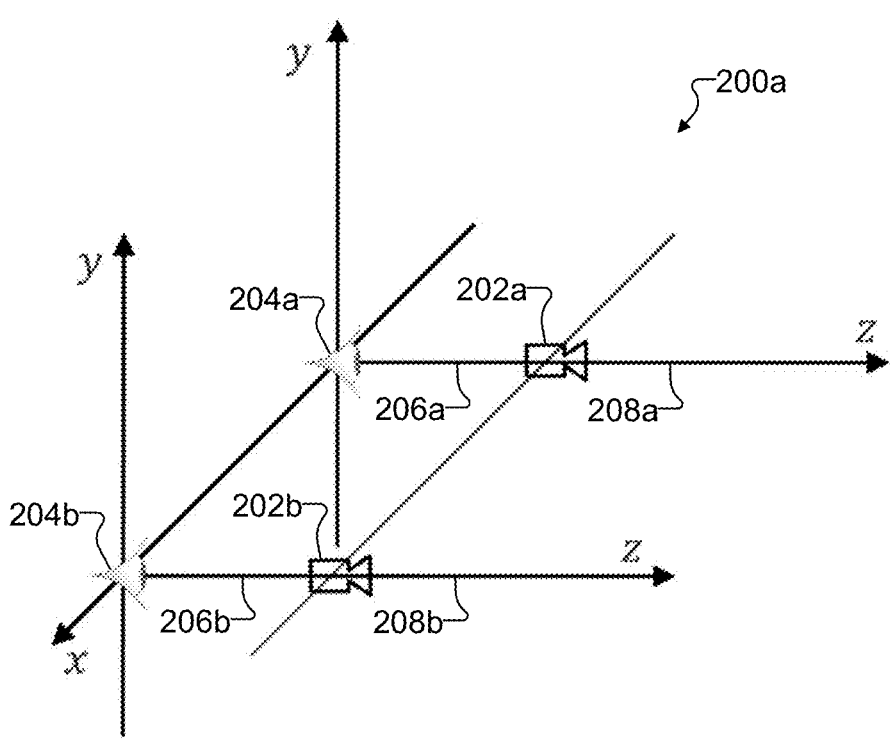
FIGS. 2A through 2G illustrate example configurations of see-through cameras in a video see-through (VST) extended reality (XR) device in accordance with this disclosure.

The various configurations 200a-200g shown here vary based on the positions and/or angles of the see-through cameras 202a-202b. For example, the configuration 200a of FIG. 2A represents a standard configuration in which the see-through cameras 202a-202b are positioned along the forward axes 206a-206b and are oriented such that the optical axes 208a-208b match the forward axes 206a-206b. In other words, in this configuration 200a, the see-through cameras $202a$-$202b$ are positioned directly in front of the user's eyes $204a$-$204b$ and look forward in the same direction. In this configuration $200a$, a simple transformation can be used to convert see-through images captured using the see-through cameras $202a$-$202b$ into virtual images presented to the user's eyes $204a$-$204b$.

Figure 2B:
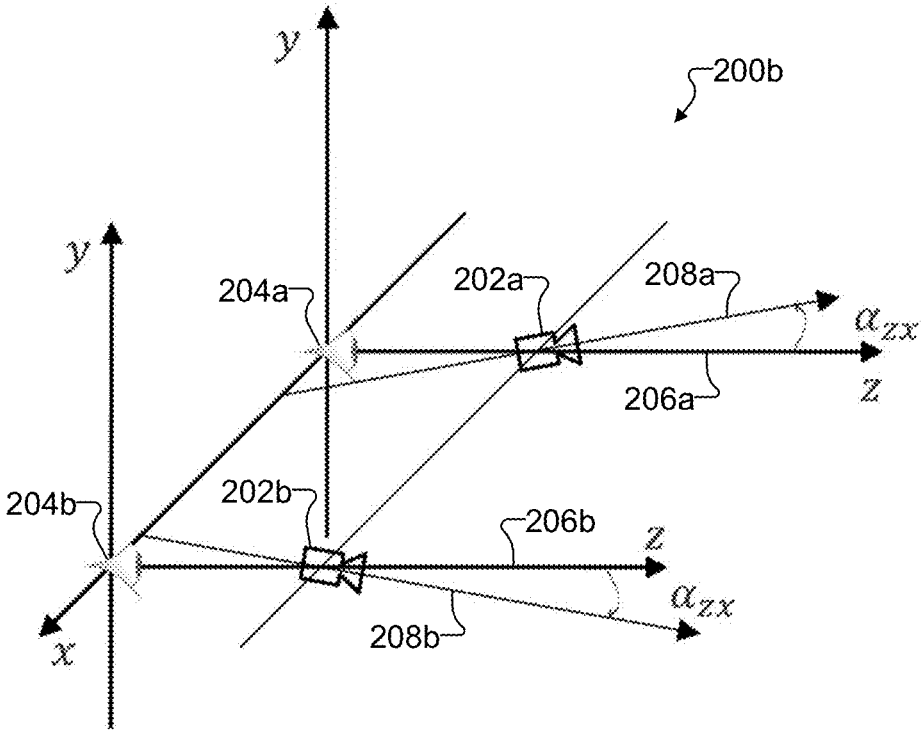
Figure 2C:
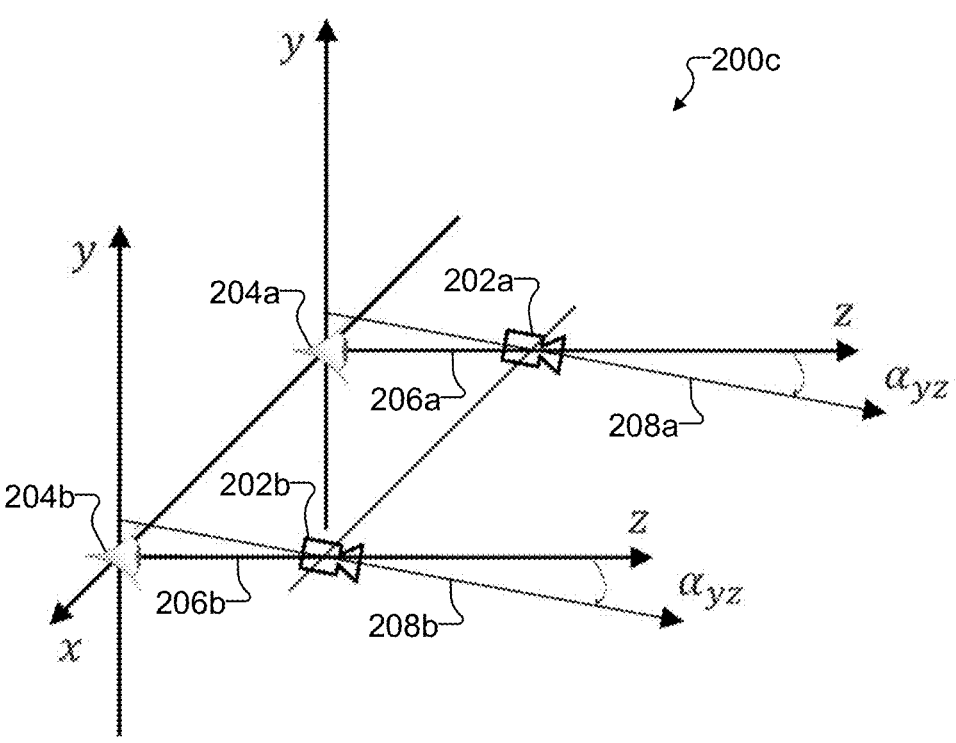

The configurations $200b$-$200g$ depart from this standard configuration $200a$, which complicates the generation of virtual images. For example, the configuration $200b$ of FIG. 2B represents a configuration in which the see-through cameras $202a$-$202b$ are positioned along the forward axes $206a$-$206b$ and are each angled outward by an angle $\alpha_{zx}$. In this configuration $200b$, the see-through cameras $202a$-$202b$ are positioned directly in front of the user's eyes $204a$-$204b$ and look outward. The configuration $200c$ of FIG. 2C represents a configuration in which the see-through cameras $202a$-$202b$ are positioned along the forward axes $206a$-$206b$ and are angled downward by an angle $\alpha_{yz}$. In this configuration $200c$, the see-through cameras $202a$-$202b$ are positioned directly in front of the user's eyes $204a$-$204b$ and look downward.

Figure 2D:
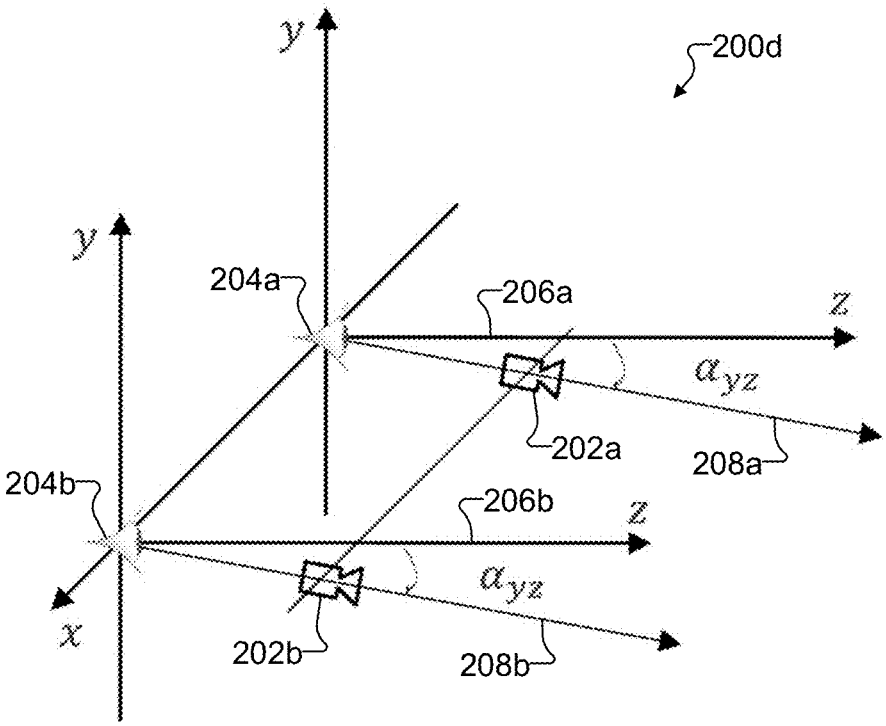
Figure 2E:
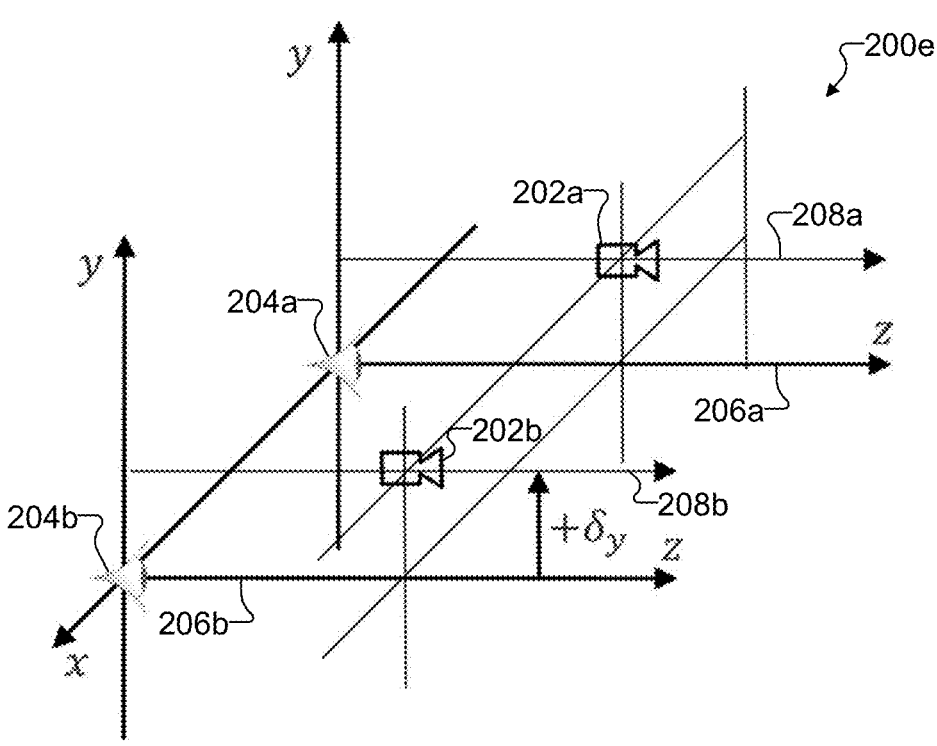
Figure 2F:
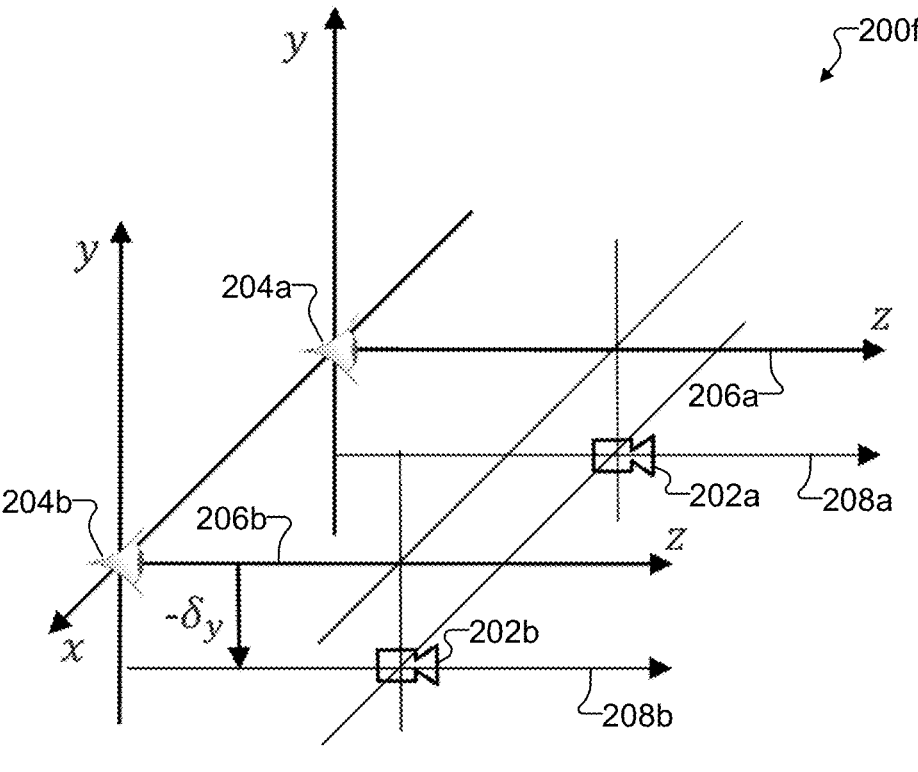
Figure 2G:
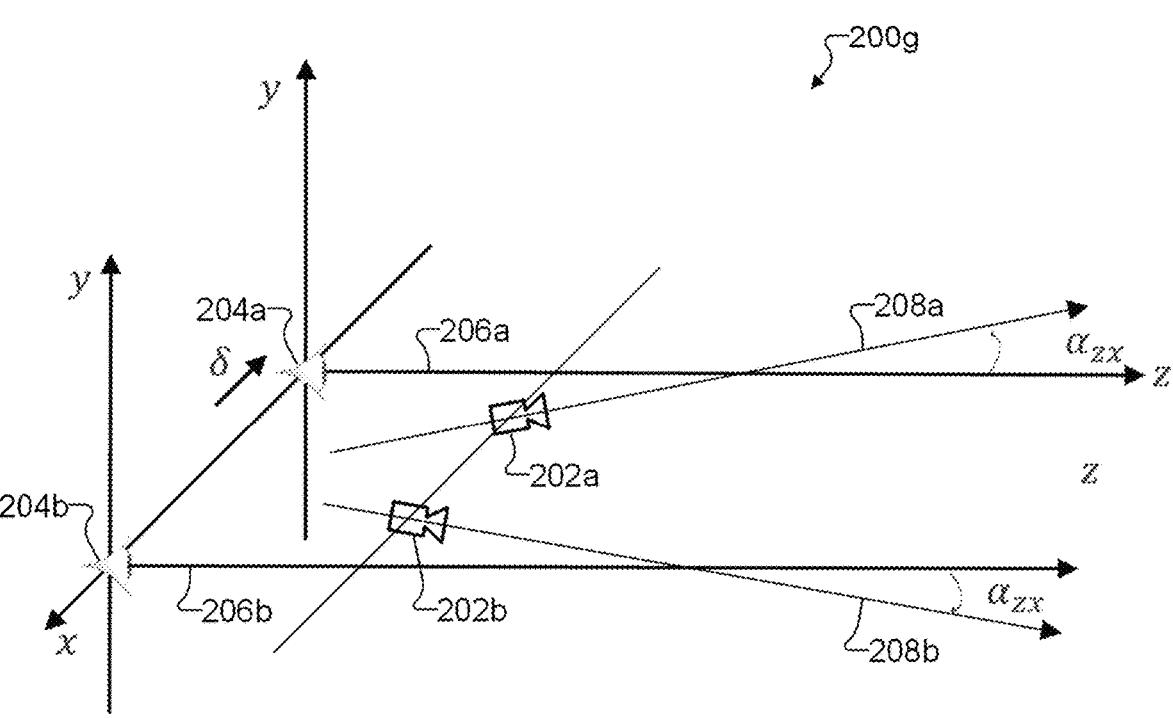

The configuration $200d$ of FIG. 2D represents a configuration in which the see-through cameras $202a$-$202b$ are positioned below the user's eyes $204a$-$204b$ and look downward. In this configuration $200d$, the see-through cameras $202a$-$202b$ are not positioned along the forward axes $206a$-$206b$. The configurations $200e$-$200f$ of FIGS. 2E and 2F represent configurations in which the see-through cameras $202a$-$202b$ are positioned above and below the user's eyes $204a$-$204b$ by distances $+\delta_y$ and $-\delta_y$ and are looking forward. In these configurations $200e$-$200f$, the see-through cameras $202a$-$202b$ are not positioned along the forward axes $206a$-$206b$, and the optical axes $208a$-$208b$ of the see-through cameras $202a$-$202b$ are generally parallel with the forward axes $206a$-$206b$. The configuration $200g$ of FIG. 2G represents a configuration in which the see-through cameras $202a$-$202b$ are positioned inward of the user's eyes $204a$-$204b$ each by a distance $\delta$ and are looking outward. In this configuration $200g$, the see-through cameras $202a$-$202b$ are not positioned along the forward axes $206a$-$206b$, and the optical axes $208a$-$208b$ of the see-through cameras $202a$-$202b$ are not generally parallel with the forward axes $206a$-$206b$.

The configurations $200b$-$200g$ shown here provide different fields of view compared to the configuration $200a$. For example, the configuration $200b$ can provide a wider field of view compared to the configuration $200a$, and the configurations $200c$-$200d$ can provide fields of view that are angled downward compared to the configuration $200a$. As another example, the configurations $200d$-$200g$ can provide fields of view from different perspectives compared to the configuration $200a$. These configurations $200b$-$200g$ can be collectively described as involving arrangements of the see-through cameras $202a$-$202b$ in which the see-through cameras $202a$-$202b$ are (i) offset from the forward axes $206a$-$206b$ extending from the expected locations of the user's eyes $204a$-$204b$ when using the VST XR device and/or (ii) rotated such that the optical axes $208a$-$208b$ of the see-through cameras $202a$-$202b$ are angled relative to the forward axes $206a$-$206b$. The techniques described below can be used to convert see-through images captured using the see-through cameras $202a$-$202b$ in the various configurations $200b$-$200g$ (or other non-standard configurations) into virtual images that appear as if they are captured at the viewpoints of the user's eyes $204a$-$204b$.

Although FIGS. 2A through 2G illustrate examples of configurations $200a$-$200g$ of see-through cameras $202a$-

$202b$ in a VST XR device, various changes may be made to FIGS. 2A through 2G. For example, other configurations of the see-through cameras $202a$-$202b$ are possible. As particular examples, the see-through cameras $202a$-$202b$ could be angled outward, inward, downward, upward, or in other directions relative to the forward axes $206a$-$206b$. Also or alternatively, the see-through cameras $202a$-$202b$ could be positioned above, below, outward, inward, or in other positions relative to the forward axes $206a$-$206b$. In FIG. 2G, for instance, the see-through cameras $202a$-$202b$ could be positioned outward of the user's eyes $204a$-$204b$ rather than inward.

Figure 3A:
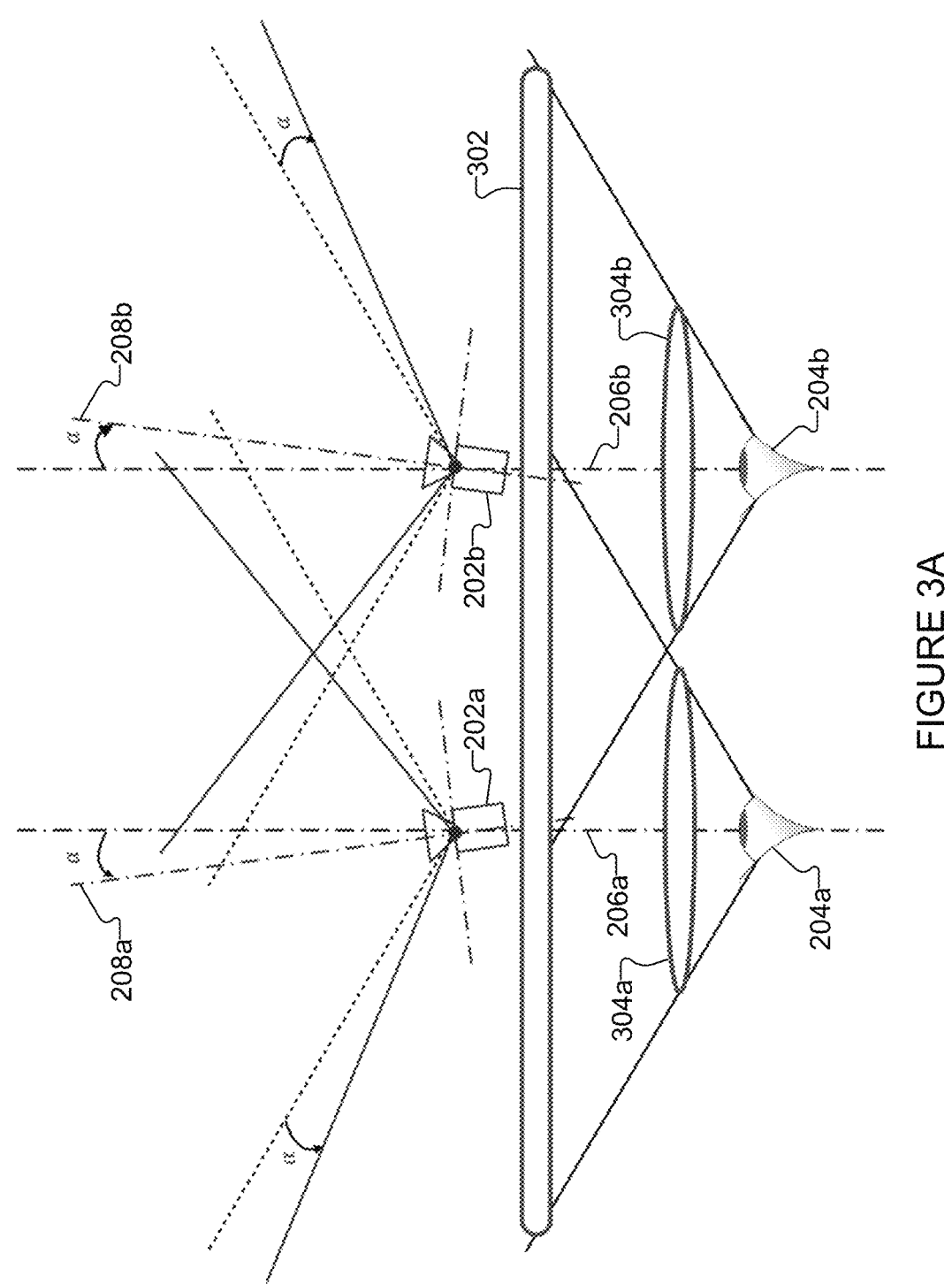
FIGS. 3A through 3C illustrate an example modification of a field of view using a VST XR device having a specified configuration of see-through cameras and resulting changes to captured see-through images in accordance with this disclosure.
Figure 3B:
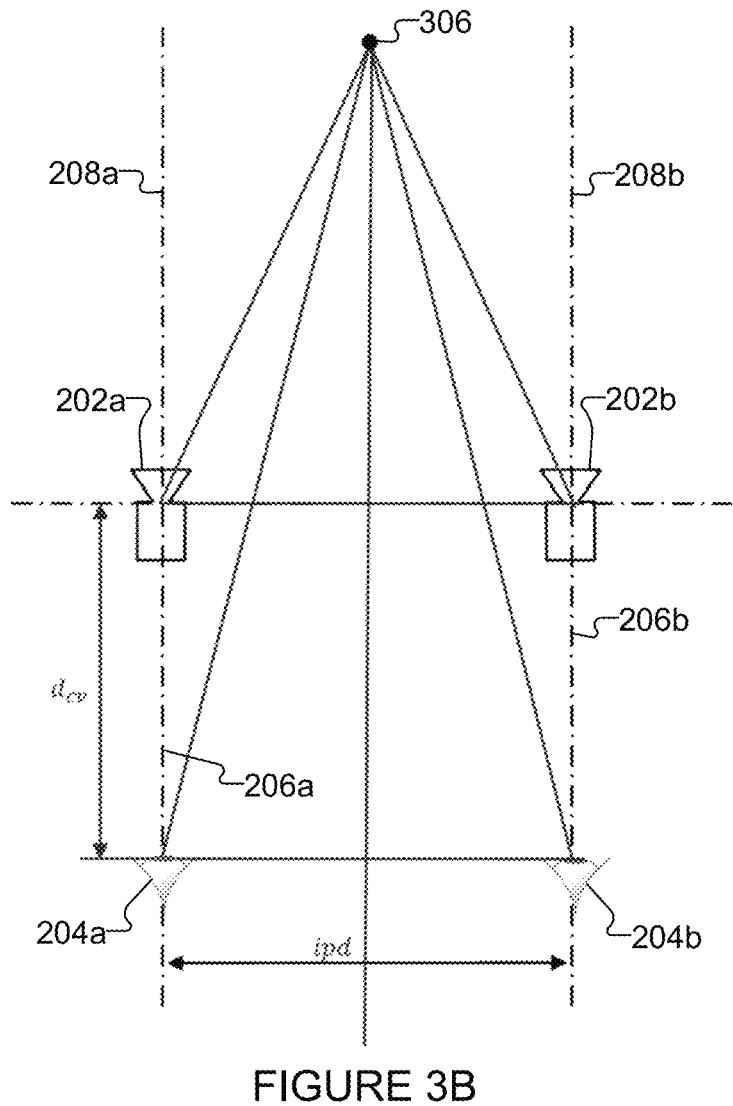
Figure 3C:
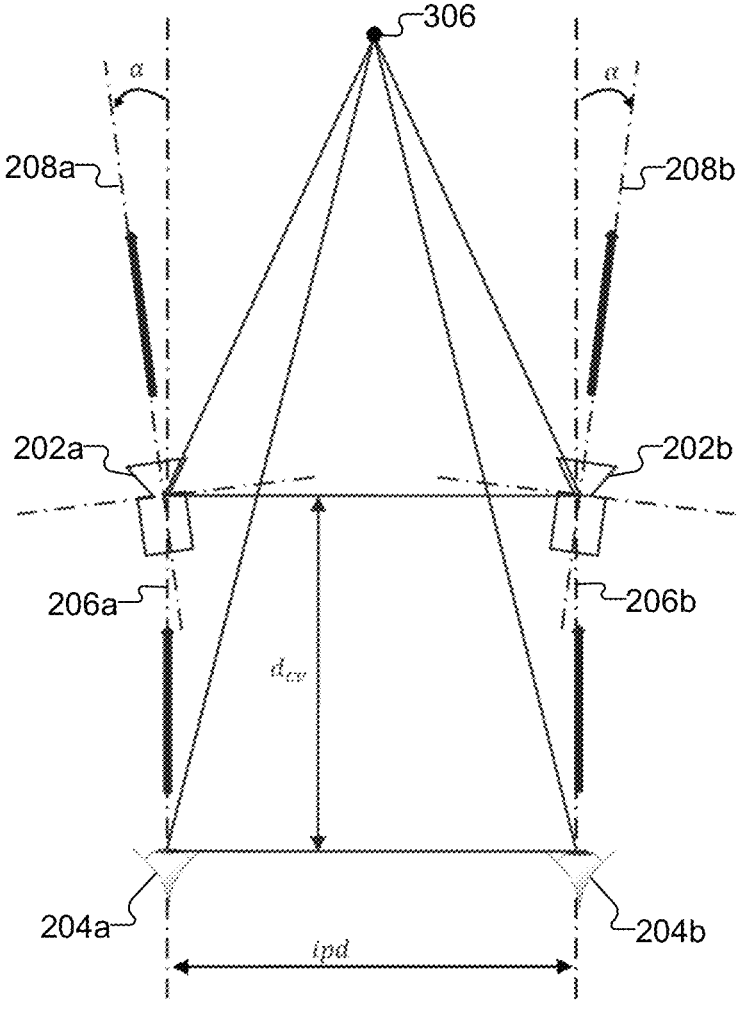

FIGS. 3A through 3C illustrate an example modification of a field of view using a VST XR device having a specified configuration of see-through cameras $202a$-$202b$ and resulting changes to captured see-through images in accordance with this disclosure. More specifically, FIGS. 3A through 3C illustrate how the field of view of a VST XR device can be modified using the configuration $200b$ of see-through cameras $202a$-$202b$ described above. However, other modifications to a VST XR device's field of view can be obtained using other configurations of see-through cameras $202a$-$202b$, including the configuration $200c$-$200g$ described above.

As shown in FIG. 3A, the VST XR device includes at least one display panel 302 and display lenses $304a$-$304b$. The at least one display panel 302 is used to present rendered images to a user, and the display lenses $304a$-$304b$ are used to focus the rendered images onto the user's eyes $204a$-$204b$. This results in the presentation of virtual images to the user. The at least one display panel 302 may, for example, represent one or more displays 160 of the electronic device 101. In some cases, the at least one display panel 302 may include separate displays that are viewed by the user's eyes $204a$-$204b$. In other cases, the at least one display panel 302 may include different portions of the same display that are viewed by the user's eyes $204a$-$204b$. The display lenses $304a$-$304b$ may represent convex-convex lenses or other suitable lenses used in the electronic device 101.

In this example, the see-through cameras $202a$-$202b$ are angled outward so that the optical axes $208a$-$208b$ of the see-through cameras $202a$-$202b$ are not positioned along the forward axes $206a$-$206b$. Here, each of the see-through cameras $202a$-$202b$ is angled outward by an angle $\alpha$. Assuming each see-through camera $202a$-$202b$ has the same field of view as the corresponding eye $204a$-$204b$ when not rotated by the angle $\alpha$, the see-through cameras $202a$-$202b$ as angled in the configuration $200b$ collectively increase the overall field of view captured in the see-through images by $2\alpha$. As a result, the virtual images presented to the user's eyes $204a$-$204b$ can also collectively increase the user's overall field of view by $2\alpha$.

FIGS. 3B and 3C illustrate how this change affects see-through images captured using the see-through cameras $202a$-$202b$. As shown in FIG. 3B, the configuration $200a$ of the see-through cameras $202a$-$202b$ is used. The distance between each see-through camera $202a$-$202b$ and its virtual rendering camera (its associated eye $204a$-$204b$) is denoted $d_{cv}$ and depends on the distance between the see-through camera $202a$-$202b$ and the associated display panel 302 or portion thereof and the distance between the associated eye's viewpoint and the associated display panel 302 or portion thereof. The distance between the two see-through cameras $202a$-$202b$ here is the same as the distance between the two eye viewpoints, which is called the inter-pupillary distance and is denoted ipd. In this configuration $200a$, the see-through cameras 202a-202b and the associated virtual rendering cameras look forward in the same direction and along the same axes.

In contrast, as shown in FIG. 3C, the configuration 200b of the see-through cameras 202a-202b is used. Again, the distance between each see-through camera 202a-202b and its virtual rendering camera is denoted $d_{cv}$, and the inter-pupillary distance ipd is the same. However, in the configuration 200b, the see-through cameras 202a-202b and the virtual rendering cameras do not look in the same direction. One possible advantage of this configuration 200b is that it can extend the user's field of view by 2a as shown in FIG. 3A. However, one possible disadvantage of this configuration 200b is that it involves the performance of additional computations and increased processing. This is because the rotation of the see-through cameras 202a-202b alters how the scene is captured in the resulting see-through images.

As an example, a point 306 in FIG. 3B is located at a position in a see-through image captured by the left see-through camera 202a and at a position in a see-through image captured by the right see-through camera 202b. However, the same point 306 captured in FIG. 3C is now located at a different position in a see-through image captured by the left see-through camera 202a and at a different position in a see-through image captured by the right see-through camera 202b (compared to FIG. 3B). In order to render virtual images to the user's eyes 204a-204b that appear to be captured using virtual cameras at the viewpoints of the user's eyes 204a-204b, additional processing needs to be performed (compared to FIG. 3B) to transform the see-through images captured in FIG. 3C into suitable virtual images. Thus, the see-through images captured using the configuration 200b shown in FIG. 3C need to undergo additional processing in order to generate virtual images that are suitable for presentation to the user. The following discussion describes how these types of transformations can be identified and performed while providing high performance and while generating high-quality virtual images for presentation to the user.

Although FIGS. 3A through 3C illustrate one example of a modification of a field of view using a VST XR device having a specified configuration of see-through cameras 202a-202b and resulting changes to captured see-through images, various changes may be made to FIGS. 3A through 3C. For example, the configurations 200c-200g described above can result in different modifications to the user's field of view, as well. For instance, each of these configurations 200c-200g can change where points 306 within a scene are captured in see-through images. Also, the at least one display panel 302 and the display lenses 304a-304b may be used with any of the configurations 200a-200g described above or with any other suitable configurations of see-through cameras 202a-202b.

Figure 4:
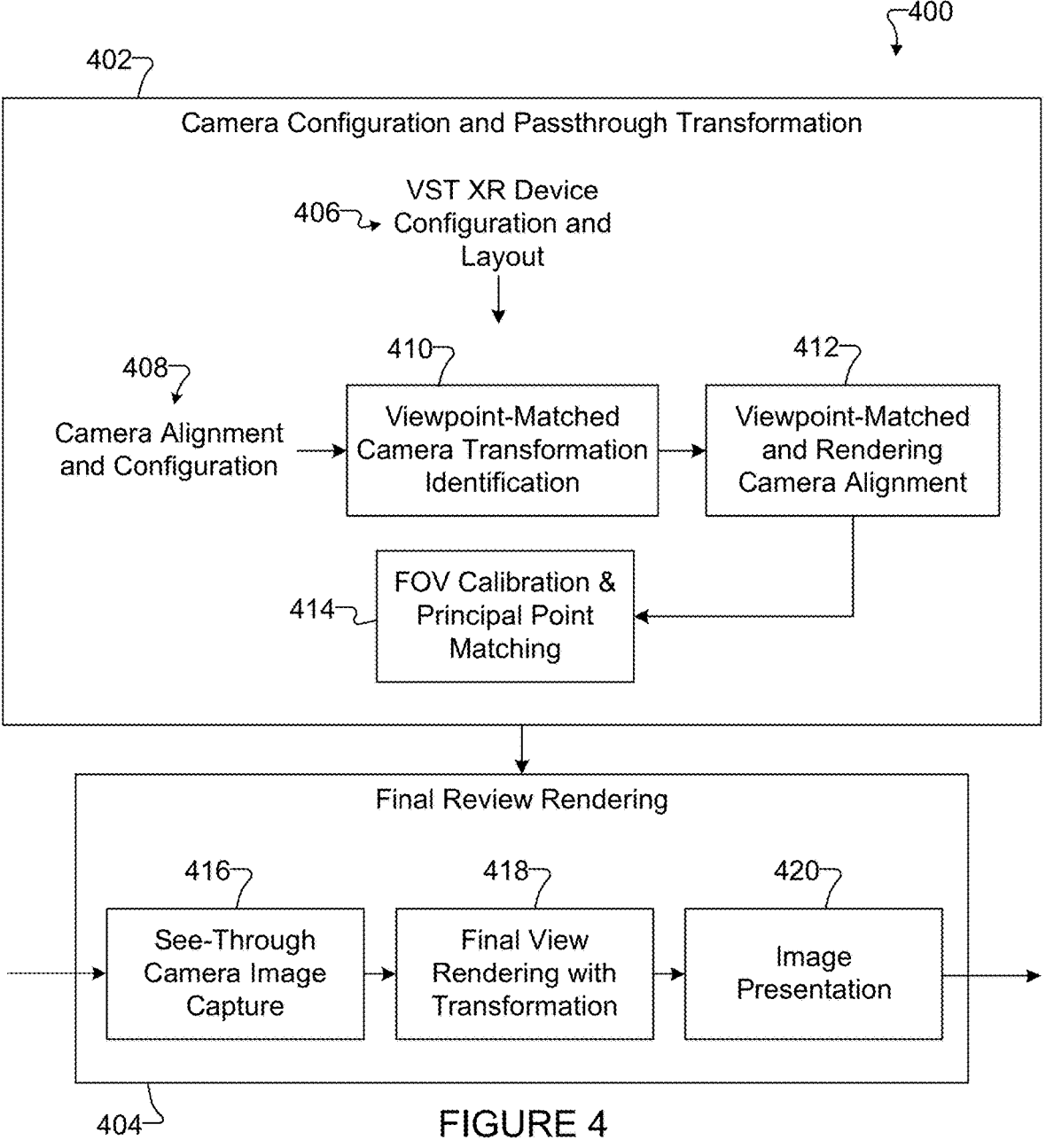
FIG. 4 illustrates an example functional architecture supporting final view generation using offset and/or angled see-through cameras in VST XR in accordance with this disclosure.

FIG. 4 illustrates an example functional architecture 400 supporting final view generation using offset and/or angled see-through cameras 202a-202b in VST XR in accordance with this disclosure. For ease of explanation, the architecture 400 of FIG. 4 is described as being implemented using the electronic device 101 in the network configuration 100 of FIG. 1, where the architecture 400 may be used with any of the configurations 200a-200g of see-through cameras 202a-202b shown in FIGS. 2A through 2G. However, the architecture 400 may be implemented using any other suitable device(s) and in any other suitable system(s), and the architecture 400 may be used with any other suitable configurations of see-through cameras 202a-202b.

As shown in FIG. 4, the functional architecture 400 is generally divided into two primary operations, namely a camera configuration and passthrough transformation operation 402 and a final view rendering operation 404. The camera configuration and passthrough transformation operation 402 generally operates to identify a passthrough transformation that accounts for the specific configuration of see-through cameras 202a-202b being used in a VST XR device. The final view rendering operation 404 generally operates to apply that passthrough transformation to obtained see-through images in order to generate rendered virtual images for presentation to a user of the VST XR device. In some embodiments, the camera configuration and passthrough transformation operation 402 can provide an efficient and potentially latency-free passthrough transformation for use in rendering the virtual images.

In this example, the camera configuration and passthrough transformation operation 402 includes or has access to VST XR device configuration and layout information 406, and camera alignment and configuration information 408 can be obtained from the configuration and layout information 406. The configuration and layout information 406 generally represents information defining the configuration and layout of various components of the VST XR device. Among other things, the configuration and layout information 406 can include positions and angles of the see-through cameras 202a-202b, which in some cases may be expressed relative to expected positions of the user's eyes 204a-204b, and this information can be used as the camera alignment and configuration information 408. For instance, the configuration and layout information 406 may identify or may be used to identify, for each see-through camera 202a-202b, the position of that see-through camera 202a-202b in one or more dimensions relative to the expected position of the associated eye 204a-204b and a rotation angle of that see-through camera 202a-202b relative to a forward axis 206a-206b of the associated eye 204a-204b.

The camera configuration and passthrough transformation operation 402 uses the camera alignment and configuration information 408 to create an efficient passthrough transformation for the configuration of see-through camera 202a-202b. Here, the camera alignment and configuration information 408 is provided to a viewpoint-matched camera transformation identification function 410, which generally operates to identify a first transformation between see-through camera viewpoints and viewpoint-matched virtual camera viewpoints. A viewpoint-matched virtual camera represents a virtual camera that is assumed to be positioned at an associated eye 204a-204b and to have the same orientation as the corresponding see-through camera 202a-202b. Thus, for a see-through camera 202a-202b pointing outward or downward, the associated viewpoint-matched virtual camera would be located at a user's eye 204a-206b and facing in the same direction outward or downward. For a see-through camera 202a-202b pointing forward, the associated viewpoint-matched virtual camera would be located at a user's eye 204a-206b and pointing forward.

Note that a viewpoint-matched virtual camera need not be equivalent to a virtual rendering camera. A virtual rendering camera refers to a virtual camera that is assumed to be positioned at an associated eye 204a-204b and to be looking forward, while a viewpoint-matched virtual camera refers to a virtual camera that is assumed to be positioned at the associated eye 204a-204b and pointing in the same direction as a see-through camera 202a-202b (which may or may not be pointing forward). If the see-through cameras 202a-202b are angled and not looking forward, the resulting viewpoint-matched virtual cameras would also be angled and not looking forward, but the associated virtual rendering cameras would not be angled and would be looking forward.

An alignment function 412 is used to determine how to rectify or align image planes of the viewpoint-matched virtual cameras to image planes of the virtual rendering cameras. For example, in some cases, the alignment function 412 can determine how to rotate and/or translate a viewpoint-matched virtual camera's image plane to match the associated virtual rendering camera's image plane. In some cases, no adjustment may be needed, such as when the viewpoint-matched virtual cameras are already looking forward. The alignment function 412 effectively determines how to create a stereo pair of virtual images. A field of view (FOV) calibration and principal point matching function 414 calibrates the field of view for the pipeline and determines how to align principal points of the viewpoint-matched virtual cameras and principal points of one or more display panels 302. The result of these operations by the camera configuration and passthrough transformation operation 402 is an identification of a passthrough transformation. The passthrough transformation identifies how see-through images captured using the specific configuration of see-through cameras 202a-202b of the VST XR device can be transformed directly into virtual images that can be presented to the user's eyes 204a-204b via the display panel(s) 302. Note that the passthrough transformation can include multiple transformations, such as one transformation for the left see-through camera 202a and one transformation for the right see-through camera 202b.

In this example, the final view rendering operation 404 includes a see-through camera image capture function 416, which generally operates to obtain see-through images captured using the see-through cameras 202a-202b. For example, the image capture function 416 may be used to obtain see-through images at a desired frame rate, such as 30, 60, 90, or 120 frames per second. A final view rendering function 418 applies the passthrough transformation to the obtained see-through images in order to generate final virtual images to be presented to the user. An image presentation function 420 initiates display of the final virtual images on the one or more display panels 302. By applying the passthrough transformation to the obtained see-through images, the final view rendering operation 404 generates final virtual images that appear as if they are captured using cameras positioned at the locations of the user's eyes 204a-204b.

In some cases, the passthrough transformation may be defined ahead of time, stored, and applied when see-through image capture starts, such as when the passthrough transformation is generated during an initialization of a VST XR device. In other cases, the passthrough transformation may be defined at the start of see-through image capture, and the same passthrough transformation can be applied throughout see-through image capture. This is because the specific configuration of the see-through cameras 202a-202b can generally remain fixed during see-through image capture, so the passthrough transformation can be determined for that specific configuration and applied to the see-through images captured using that specific configuration. Thus, the passthrough transformation may represent a static transformation that can be applied to the see-through images without requiring computational resources or associated latency to keep identifying the passthrough transformation as the see-through images are being captured and processed. Moreover, since the passthrough transformation already includes field of view calibrations and principal point matching, the final virtual images presented on the display panel(s) 302 are aligned between the see-through cameras 202a-202b, the virtual rendering cameras, and the display panel(s) 302. Note, however, that the passthrough transformation can be easily reidentified as needed or desired using the approaches described above, such as if the positions and/or angles of the see-through cameras 202a-202b are adjusted manually or automatically during use.

Although FIG. 4 illustrates one example of a functional architecture 400 supporting final view generation using offset and/or angled see-through cameras 202a-202b in VST XR, various changes may be made to FIG. 4. For example, various components or functions in FIG. 4 may be combined, further subdivided, replicated, omitted, or rearranged and additional components or functions may be added according to particular needs. Also, the functional architecture 400 can be used with a wide variety of see-through camera configurations, including any of the configurations 200a-200g described above.

FIGS. 5A through 10C illustrate example determinations of a first transformation for various configurations of see-through cameras 202a-202b in a VST XR device in accordance with this disclosure. More specifically, FIGS. 5A through 10C illustrate how example first transformations may be identified by the viewpoint-matched camera transformation identification function 410 for the various configurations 200b-200g of see-through cameras 202a-202b described above.

Figure 5A:
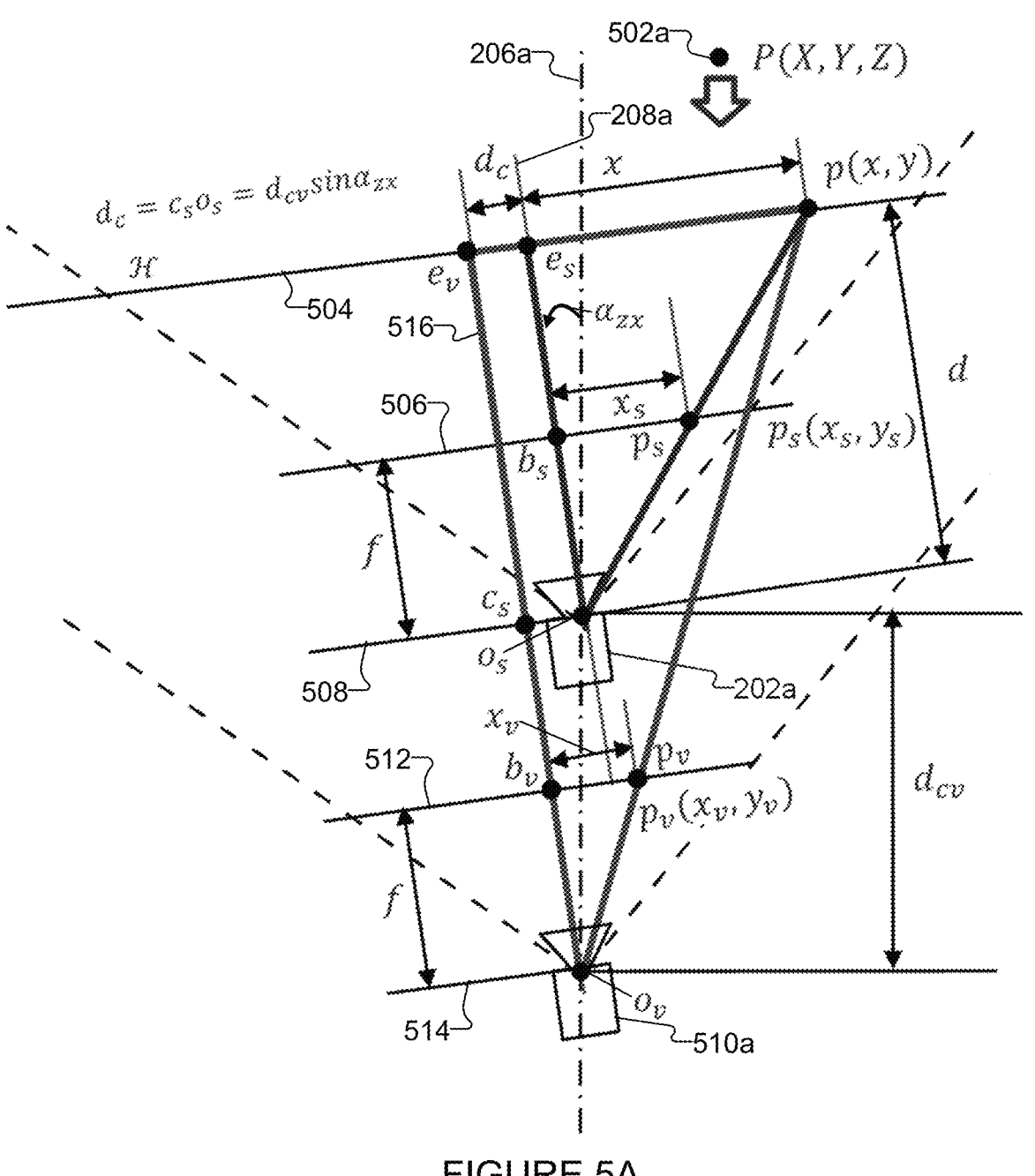
FIGS. 5A through 10C illustrate example determinations of a first transformation for various configurations of see-through cameras in a VST XR device in accordance with this disclosure.
Figure 5B:
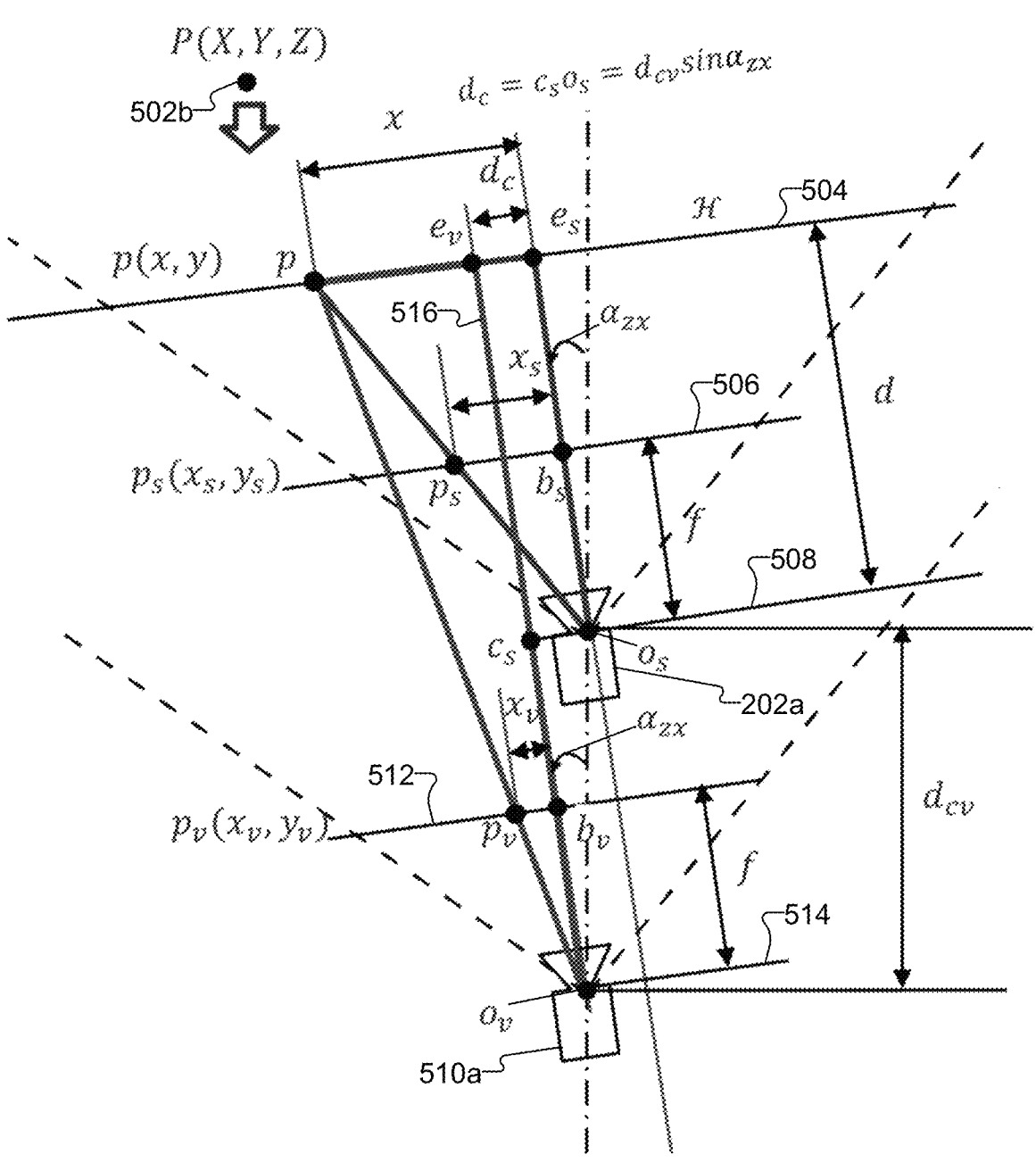
Figure 5C:
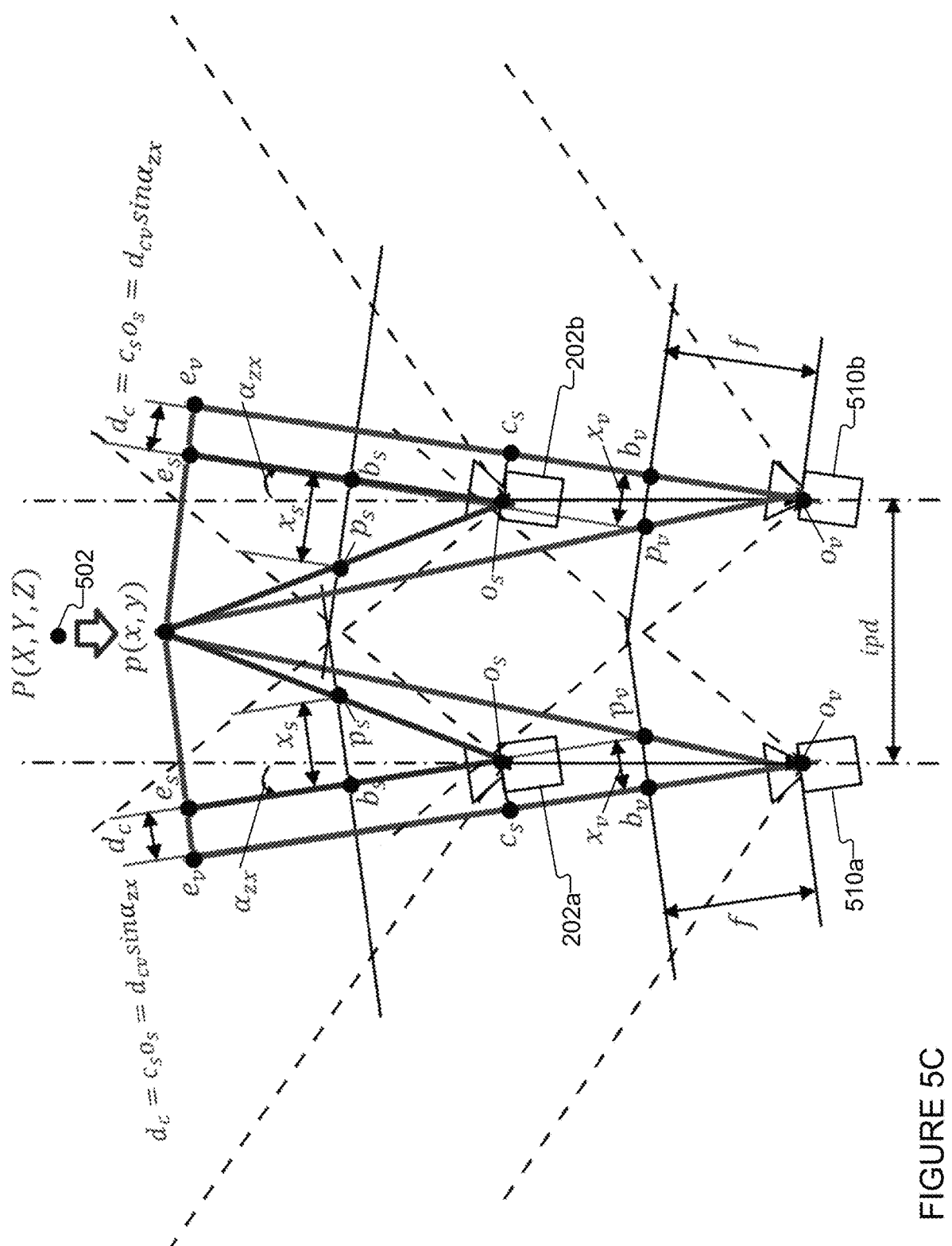

FIGS. 5A through 5C illustrate an example determination of a first transformation for see-through cameras 202a-202b having the configuration 200b shown in FIG. 2B. As shown in FIG. 5A, the see-through camera 202a is angled outward and is positioned along the forward axis 206a. A scene is being imaged that includes a point 502a, which is located inward from the perspective of the see-through camera 202a. Here, an image plane 504 represents a projection plane for the scene being imaged, an image plane 506 represents the plane where see-through images are captured using the see-through camera 202a, and a plane 508 represents a location of an optical center of the see-through camera 202a. A viewpoint-matched virtual camera 510a is defined here, where the viewpoint-matched virtual camera 510a is located where the user's left eye 204a is expected to be and has the same orientation as the corresponding see-through camera 202a. An image plane 512 represents the plane where virtual images would be captured using the viewpoint-matched virtual camera 510a, and a plane 514 represents a location of an optical center of the viewpoint-matched virtual camera 510a. The see-through camera 202a here is angled outward at an angle $\alpha_{zx}$.

Based on this, it is possible to derive the following. The 3D scene being imaged can be projected onto the projection plane $\mathcal{H}$ (the image plane 504) as follows.

$$p(x,y) = \mathcal{H}(P(X,Y,Z))$$

Here, P represents the point 502 at coordinates X, Y, Z in the 3D scene, and p represents the projection of that point 502 at coordinates x and y onto the image plane 504. As can be seen in FIG. 5A, $o_s$ represents the center of the lens of the see-through camera 202a, $e_s$ represents the location where the optical axis 208a of the see-through camera 202a intersects the image plane 504, $b_s$ represents the location where the optical axis 208a intersects the image plane 506, and $p_s$ represents the location of the point 502 at coordinates $x_s$ and $y_s$ when a see-through image of the scene is captured at the image plane 506. A relationship between the projection plane $\mathcal{H}$ and the see-through plane (the image plane 506) can be defined based on $\Delta o_s e_s p$ and $\Delta o_s b_s p_s$ as follows.

$$\frac{x}{x_s} = \frac{d}{f}$$

Here, x represents a coordinate of the point 502, $x_s$ represents a coordinate of the point $p_s$, d represents the depth of the point 502 from the see-through camera 202a, and $f$ represents the focal length of the see-through camera 202a (which is also assumed to be the focal length of the viewpoint-matched virtual camera 510a). In this example, x represents the distance of the point 502 as projected onto the image plane 504 as point p(x, y) from the optical axis 208a of the see-through camera 202a, and $x_s$ represents the distance of the point 502 as captured in the see-through image at the image plane 506 from the optical axis 208a.

As can be seen in FIG. 5A, $o_v$ represents the center of the lens of the viewpoint-matched virtual camera 510a, $e_v$ represents the location where an optical axis 516 of the viewpoint-matched virtual camera 510a intersects the image plane 504, $b_v$ represents the location where the optical axis 516 intersects the image plane 506, and $p_v$ represents the location of the point 502 at coordinates $x_v$ and $y_v$ in a virtual image of the scene assumed to be captured by the viewpoint-matched virtual camera 510a at the image plane 512. A relationship between the projection plane $\mathcal{H}$ and the viewpoint-matched frame (the image plane 512) can be defined based on $\Delta o_v e_v p$ and $\Delta o_v b_v p_v$ as follows.

$$\frac{x + d_c}{x_v} = \frac{d + d_{cv}\cos\alpha_{zx}}{f} = \frac{d + \overrightarrow{o_s c_s}}{f}$$

Here, $x_v$ represents a coordinate of the image point $p_v$, and $d_c$ represents the distance between where the optical axis 516 of the viewpoint-matched virtual camera 510a and where the optical axis 208a of the see-through camera 202 intersect the image plane 504. In some cases, the distance $d_c$ can be expressed as follows.

$$d_c = d_{cv} \sin \alpha_{zx}$$

The distance $d_{cv}$ represents the distance between the optical centers of the see-through camera 202a and the viewpoint-matched virtual camera 510a. The expression $\overrightarrow{o_s c_s}$ refers to the length of the line segment between $o_s$ and $c_s$, where $c_s$ represents the point where the optical axis 516 of the viewpoint-matched virtual camera 510a intersects the plane 508.

From this, a mapping between the coordinate $x_s$ of the see-through camera 202a and the coordinate $x_v$ of the viewpoint-matched virtual camera 510a can be determined as follows.

$$x_v = \frac{dx_s + fd_{cv}\sin\alpha_{zx}}{d + d_{cv}\cos\alpha_{zx}}$$

A similar mapping between a coordinate $y_s$ of the see-through camera 202a and a coordinate $y_v$ of the viewpoint-matched virtual camera 510a can be determined as follows.

$$y_v = \frac{dy_s + fd_{cv}\sin\alpha_{zx}}{d + d_{cv}\cos\alpha_{zx}}$$

As shown in FIG. 5B, the see-through camera 202a is again angled outward and is positioned along the forward axis 206a. A scene is being imaged that includes a point 502b, which is located outward from the perspective of the see-through camera 202a. Using the same notations as above, the 3D scene being imaged can be projected onto the projection plane $\mathcal{H}$ (the image plane 504) as follows.

$$p(x,y) = \mathcal{H}(P(X,Y,Z))$$

A relationship between the projection plane $\mathcal{H}$ and the see-through plane (the image plane 506) can be defined based on $\Delta o_s e_s p$ and $\Delta o_s b_s p_s$ as follows.

$$\frac{x}{x_s} = \frac{d}{f}$$

A relationship between the projection plane $\mathcal{H}$ and the viewpoint-matched frame (the image plane 512) can be defined based on $\Delta o_v e_v p$ and $\Delta o_v b_v p_v$ as follows.

$$\frac{x - d_c}{x_v} = \frac{d + d_{cv}\cos\alpha_{zx}}{f} = \frac{d + o_v \overrightarrow{c_s}}{f}$$

From this, mappings between coordinates of the see-through camera 202a and coordinates of the viewpoint-matched virtual camera 510a can be determined as follows.

$$x_v = \frac{dx_s - fd_{cv}\sin\alpha_{zx}}{d + d_{cv}\cos\alpha_{zx}}$$

$$y_v = \frac{dy_s - fd_{cv}\sin\alpha_{zx}}{d + d_{cv}\cos\alpha_{zx}}$$

FIG. 5C illustrates how the approach shown in FIG. 5A can be used in both see-through cameras 202a-202b with an inward point 502. Using the equations defined above, for the left see-through camera 202a in FIG. 5C, the following transformation can be obtained.

$$\begin{cases} x_{v\_left} = \dfrac{dx_{s\_left} + fd_{cv}\sin\alpha_{zx}}{d + d_{cv}\cos\alpha_{zx}} \\ y_{v\_left} = \dfrac{dy_{s\_left} + fd_{cv}\sin\alpha_{zx}}{d + d_{cv}\cos\alpha_{zx}} \end{cases}$$

For the right see-through camera 202b in FIG. 5C, the following transformation can be obtained.

$$\begin{cases} x_{v\_right} = \dfrac{dx_{s\_right} + fd_{cv}\sin\alpha_{zx}}{d + d_{cv}\cos\alpha_{zx}} \\ y_{v\_right} = \dfrac{dy_{s\_right} + fd_{cv}\sin\alpha_{zx}}{d + d_{cv}\cos\alpha_{zx}} \end{cases}$$

Note that if the point 502 is located outward from the perspective of one of the see-through cameras 202a or 202b, the numerators in one of the two preceding equations would involve subtraction rather than addition pursuant to the equations defined above for FIG. 5B. These two transformations can therefore be used to define a first transformation that maps points from the image planes 506 of the see-through cameras 202a-202b onto points in the image planes 512 of viewpoint-matched virtual cameras 510a-510b. This is one example of a first transformation between see-through camera viewpoints and viewpoint-matched virtual camera viewpoints that could be identified by the viewpoint-matched camera transformation identification function 410.

Figure 6:
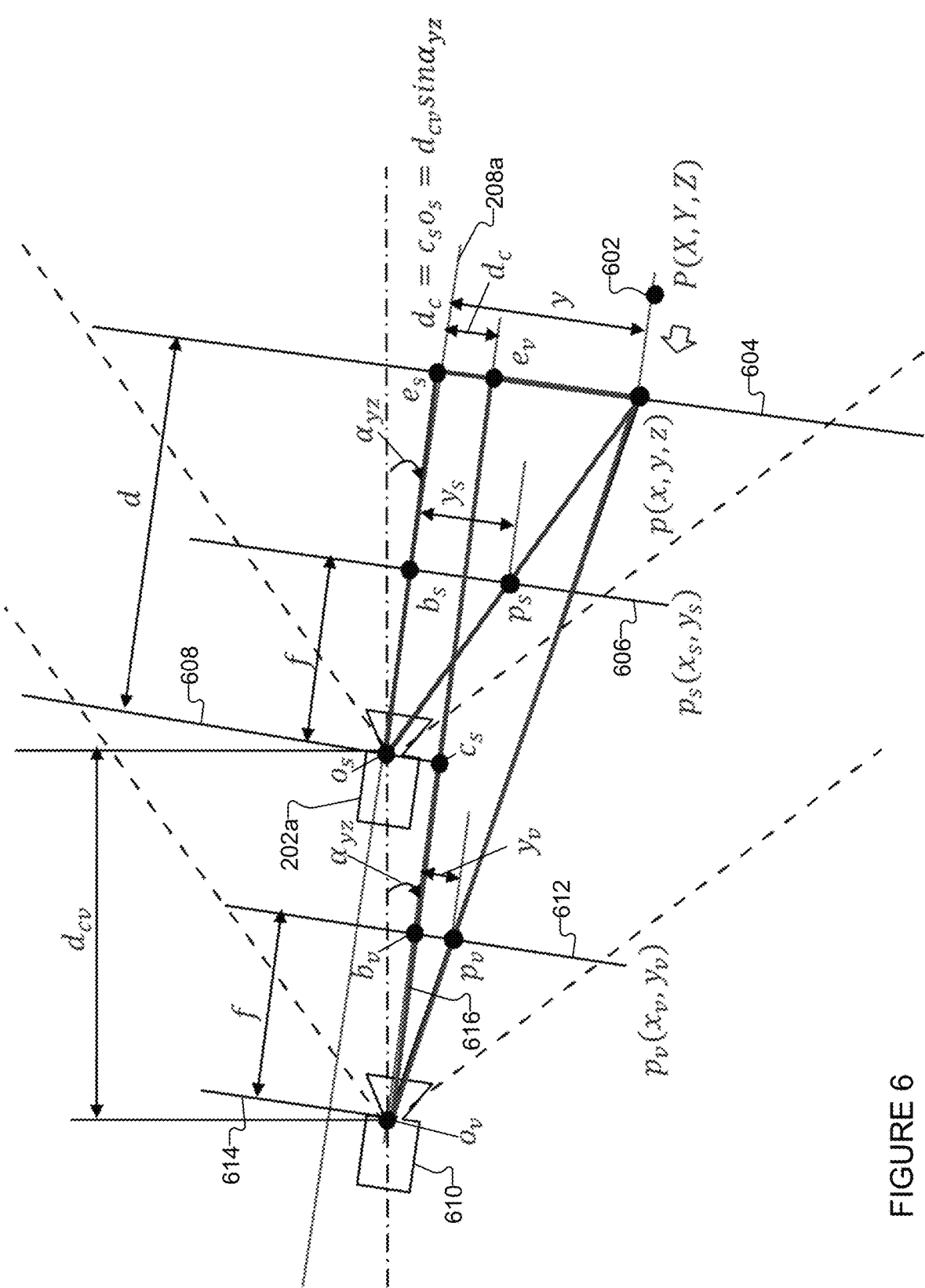

FIG. 6 illustrates an example determination of a first transformation for see-through cameras 202a-202b having the configuration 200c shown in FIG. 2C. Note that notations used with respect to FIG. 6 are similar to the notations used with respect to FIGS. 5A through 5C, although "yz" subscripts are used with respect to FIG. 6 since the rotation angle of the see-through cameras 202a-202b is now downward rather than outward.

As shown in FIG. 6, the see-through camera 202a is imaging a scene that includes a point 602. Image planes 604, 606, 612 and planes 608, 614 may be the same as or similar to the corresponding planes in FIGS. 5A through 5C. A viewpoint-matched virtual camera 610 is defined here, where the viewpoint-matched virtual camera 610 is located where the user's left eye 204a is expected to be and has the same orientation as the corresponding see-through camera 202a. The viewpoint-matched virtual camera 610 has an optical axis 616.

To define a first transformation between the see-through camera 202a and the viewpoint-matched virtual camera 610 when the see-through camera 202a looks down at an angle $\alpha_{yz}$, the following can be obtained based on $\Delta o_s e_s p$ and $\Delta o_s b_s p_s$.

$$\frac{y}{y_s} = \frac{d}{f}$$

Based on $\Delta o_v e_v p$ and $\Delta o_v b_v p_v$, the following can be obtained.

$$\frac{y - d_{cv}\sin\alpha_{yz}}{y_v} = \frac{d + d_{cv}\cos\alpha_{yz}}{f}$$

A mapping between $y_v$ and $y_s$ can be defined as follows.

$$y_v = \frac{dy_s - fd_{cv}\sin\alpha_{yz}}{d + d_{cv}\cos\alpha_{yz}}$$

A mapping between $x_v$ and $x_s$ can be defined as follows.

$$x_v = \frac{dx_s}{d + d_{cv}}$$

Using these equations, for the left see-through camera 202a, the following transformation can be obtained.

$$\begin{cases} x_{v\_left} = \dfrac{dx_{s\_left}}{d + d_{cv}} \\ y_{v\_left} = \dfrac{dy_{s\_left} - fd_{cv}\sin\alpha_{yz}}{d + d_{cv}\cos\alpha_{xy}} \end{cases}$$

A similar derivation can be used to identify the following transformation for the right see-through camera 202b.

$$\begin{cases} x_{v\_right} = \dfrac{dx_{s\_right}}{d + d_{cv}} \\ y_{v\_right} = \dfrac{dy_{s\_right} - fd_{cv}\sin\alpha_{yz}}{d + d_{cv}\cos\alpha_{yz}} \end{cases}$$

These two transformations can therefore be used to define a first transformation that maps points from the image planes 606 of the see-through cameras 202a-202b onto points in the image planes 612 of viewpoint-matched virtual cameras 610. This is another example of a first transformation between see-through camera viewpoints and viewpoint-matched virtual camera viewpoints that could be identified by the viewpoint-matched camera transformation identification function 410.

Figure 7:
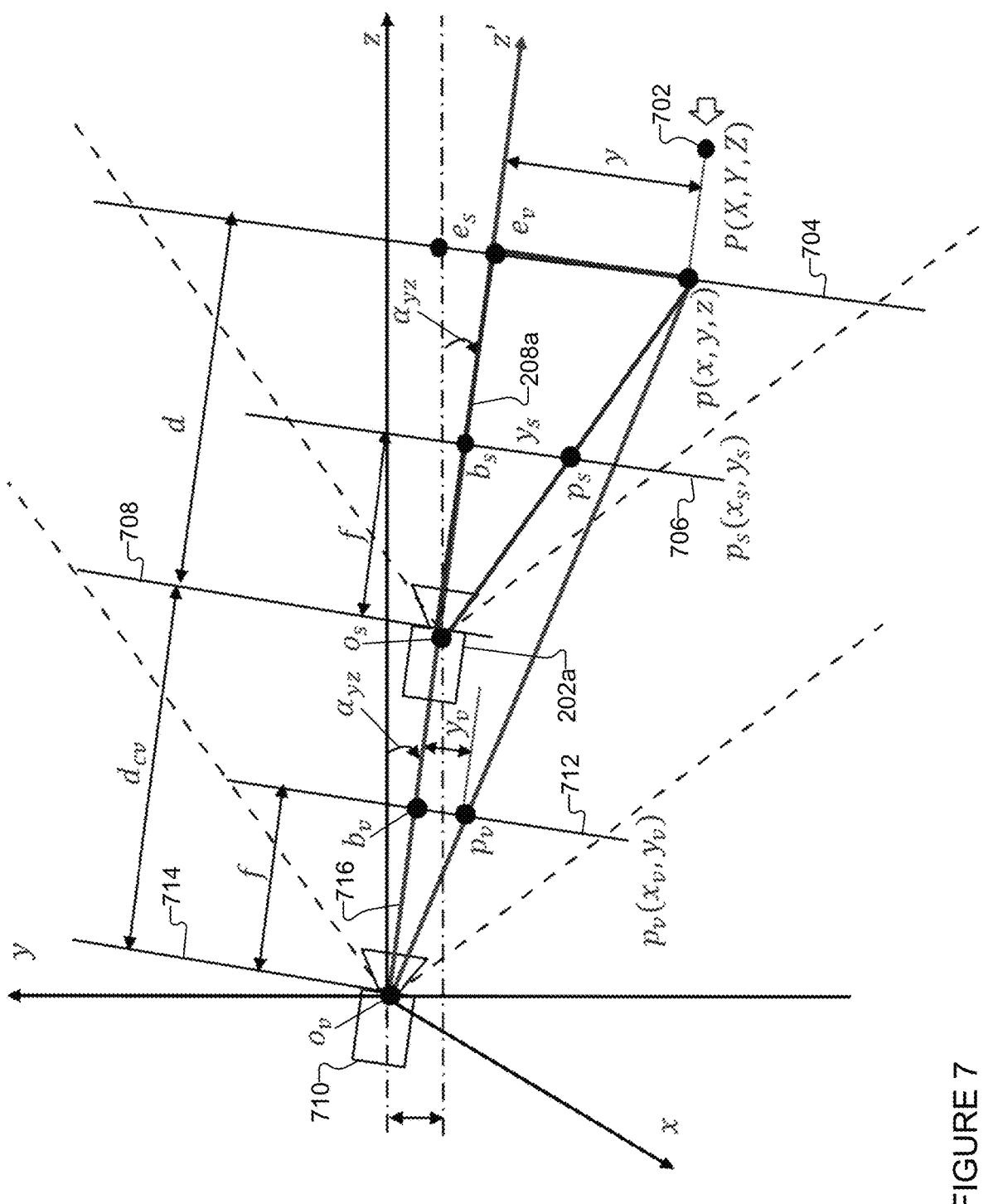

FIG. 7 illustrates an example determination of a first transformation for see-through cameras 202a-202b having the configuration 200d shown in FIG. 2D. Note that the notations used with respect to FIG. 7 are similar to the notations described above. Again, "yz" subscripts are used with respect to FIG. 7 since the rotation angle of the see-through cameras 202a-202b is downward.

As shown in FIG. 7, the see-through camera 202a is imaging a scene that includes a point 702. Image planes 704, 706, 712 and planes 708, 714 may be the same as or similar to the corresponding planes in FIGS. 5A through 6. A viewpoint-matched virtual camera 710 is defined here, where the viewpoint-matched virtual camera 710 is located where the user's left eye 204a is expected to be and has the same orientation as the corresponding see-through camera 202a. The viewpoint-matched virtual camera 710 has an optical axis 716.

To define a first transformation between the see-through camera 202a and the viewpoint-matched virtual camera 710 when the see-through camera 202a is moved down and looks down at an angle $\alpha_{yz}$, the following can be obtained based on $\Delta o_s e_s p$ and $\Delta o_s b_s p_s$.

$$\frac{y}{y_s} = \frac{d}{f}$$

Based on $\Delta o_v e_v p$ and $\Delta o_v b_v p_v$, the following can be obtained.

$$\frac{y}{y_v} = \frac{d + d_{cv}}{f}$$

A mapping between $y_v$ and $y_s$ can be defined as follows.

$$y_v = \frac{dy_s}{d + d_{cv}}$$

A mapping between $x_v$ and $x_s$ can be defined as follows.

$$x_v = \frac{dx_s}{d + d_{cv}}$$

Using these equations, for the left see-through camera 202a, the following transformation can be obtained.

$$\begin{cases} x_{v\_left} = \dfrac{dx_{s\_left}}{d + d_{cv}} \\ y_{v\_left} = \dfrac{dy_{s\_left}}{d + d_{cv}} \end{cases}$$

A similar derivation can be used to identify the following transformation for the right see-through camera 202b.

$$\begin{cases} x_{v\_right} = \dfrac{dx_{s\_right}}{d + d_{cv}} \\ y_{v\_right} = \dfrac{dy_{s\_right}}{d + d_{cv}} \end{cases}$$

These two transformations can therefore be used to define a first transformation that maps points from the image planes 706 of the see-through cameras 202a-202b onto points in the image planes 712 of viewpoint-matched virtual cameras 710. This is yet another example of a first transformation between see-through camera viewpoints and viewpoint-matched virtual camera viewpoints that could be identified by the viewpoint-matched camera transformation identification function 410.

Figure 8:
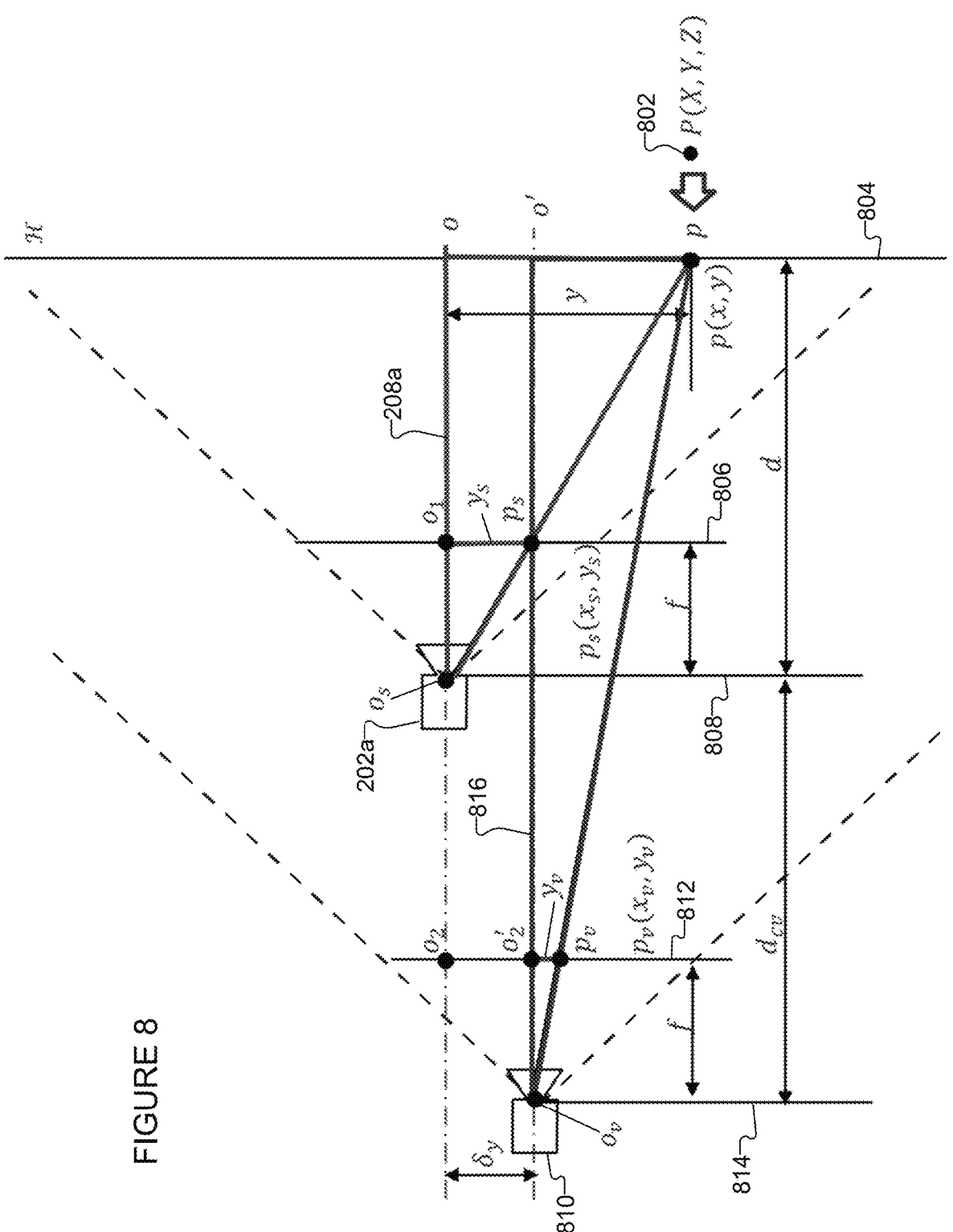

FIG. 8 illustrates an example determination of a first transformation for see-through cameras 202a-202b having the configuration 200e shown in FIG. 2E. Note that the notations used with respect to FIG. 8 are similar to the notations used above. As shown in FIG. 8, the see-through camera 202a is imaging a scene that includes a point 802. Image planes 804, 806, 812 and planes 808, 814 may be the same as or similar to the corresponding planes described above. A viewpoint-matched virtual camera 810 is defined here, where the viewpoint-matched virtual camera 810 is located where the user's left eye 204a is expected to be and has the same orientation as the corresponding see-through camera 202a. The viewpoint-matched virtual camera 810 has an optical axis 816. The see-through camera 202a is offset from the viewpoint-matched virtual camera 810 by a distance $+\delta_y$.

The 3D scene being imaged can be projected onto the projection plane $\mathcal{H}$ (the image plane 804) as follows.

$$p(x, y) = \mathcal{H}\ (P(X, Y, Z))$$

In FIG. 8, o represents the optical axis 208a of the see-through camera 202a, and o' represents an optical axis 816 of the viewpoint-matched virtual camera 810 (which is offset from the optical axis 208a). Also, $o_1$ represents the location where the optical axis 208a intersects the image plane 806, $o_2$ represents the location where the optical axis 208a intersects the image plane 812, and $o_2'$ represents the location where the optical axis 816 intersects the image plane 812. A relationship between the projection plane $\mathcal{H}$ and the see-through plane (the image plane 806) can be defined based on $\Delta opo_s$ and $\Delta o_1 p_s o_s$ as follows.

$$\frac{y}{y_s} = \frac{d}{f}$$

A relationship between the projection plane $\mathcal{H}$ and the viewpoint-matched frame (the image plane 812) can be defined based on $\Delta o'po_v$ and $\Delta o'_2 p_v o_v$ as follows.

$$\frac{y - \delta_y}{y_v} = \frac{d + d_{cv}}{f}$$

A mapping between $y_v$ and $y_s$ can be defined as follows.

$$y_v = \frac{dy_s - f\delta_y}{d + d_{cv}}$$

A mapping between $x_v$ and $x_s$ can be defined as follows.

$$x_v = \frac{dx_s}{d + d_{cv}}$$

From this, mappings between the coordinates of the see-through camera 202a and the coordinates of the viewpoint-matched virtual camera 810 can be determined as follows.

$$\begin{cases} x_{v\_left} = \dfrac{dx_{s\_left}}{d + d_{cv}} \\ y_{v\_left} = \dfrac{dy_{s\_left} - f\delta_y}{d + d_{cv}} \end{cases}$$

A similar derivation can be used to identify the following transformation for the right see-through camera 202b.

$$\begin{cases} x_{v\_right} = \dfrac{dx_{s\_right}}{d + d_{cv}} \\ y_{v\_right} = \dfrac{dy_{s\_right} - f\delta_y}{d + d_{cv}} \end{cases}$$

These two transformations can therefore be used to define a first transformation that maps points from the image planes 806 of the see-through cameras 202a-202b onto points in the image planes 812 of viewpoint-matched virtual cameras 810. This is still another example of a first transformation between see-through camera viewpoints and viewpoint-matched virtual camera viewpoints that could be identified by the viewpoint-matched camera transformation identification function 410.

Figure 9:
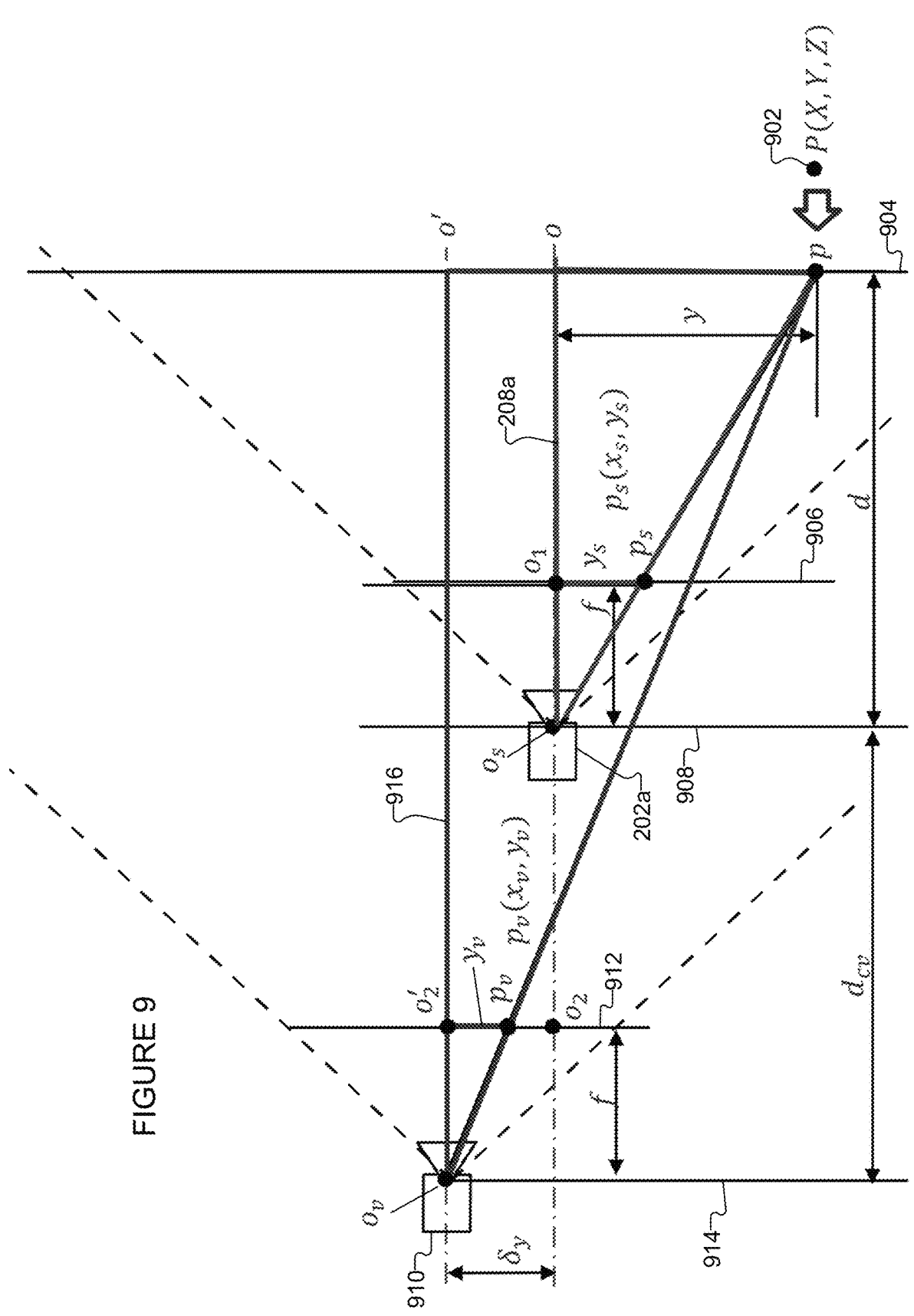

FIG. 9 illustrates an example determination of a first transformation for see-through cameras 202a-202b having the configuration 200f shown in FIG. 2F. Note that the notations used with respect to FIG. 9 are similar to the notations used above. As shown in FIG. 9, the see-through camera 202a is imaging a scene that includes a point 902. Image planes 904, 906, 912 and planes 908, 914 may be the same as or similar to the corresponding planes described above. A viewpoint-matched virtual camera 910 is defined here, where the viewpoint-matched virtual camera 910 is located where the user's left eye 204a is expected to be and has the same orientation as the corresponding see-through camera 202a. The viewpoint-matched virtual camera 910 has an optical axis 916. The see-through camera 202a is offset from the viewpoint-matched virtual camera 910 by a distance $-\delta_y$.

The 3D scene being imaged can be projected onto the projection plane $\mathcal{H}$ (the image plane 904) as follows.

$$p(x, y) = \mathcal{H}\ (P(X, Y, Z))$$

A relationship between the projection plane $\mathcal{H}$ and the see-through plane (the image plane 906) can be defined based on $\Delta opo_s$ and $\Delta o_1 p_s o_s$ as follows.

$$\frac{y}{y_s} = \frac{d}{f}$$

A relationship between the projection plane $\mathcal{H}$ and the viewpoint-matched frame (the image plane 912) can be defined based on $\Delta o' p o_v$ and $\Delta o_2 p_v o_v$ as follows.

$$\frac{y + \delta_y}{y_v} = \frac{d + d_{cv}}{f}$$

A mapping between $y_v$ and $y_s$ can be defined as follows.

$$y_v = \frac{dy_s + f\delta_y}{d + d_{cv}}$$

A mapping between $x_v$ and $x_s$ can be defined as follows.

$$x_v = \frac{dx_s}{d + d_{cv}}$$

From this, mappings between the coordinates of the see-through camera 202a and the coordinates of the viewpoint-matched virtual camera 910 can be determined as follows.

$$\begin{cases} x_{v\_left} = \dfrac{dx_{s\_left}}{d + d_{cv}} \\ y_{v\_left} = \dfrac{dy_{s\_left} + f\delta_y}{d + d_{cv}} \end{cases}$$

A similar derivation can be used to identify the following transformation for the right see-through camera 202b.

$$\begin{cases} x_{v\_right} = \dfrac{dx_{s\_right}}{d + d_{cv}} \\ y_{v\_right} = \dfrac{dy_{s\_right} + f\delta_y}{d + d_{cv}} \end{cases}$$

These two transformations can therefore be used to define a first transformation that maps points from the image planes 906 of the see-through cameras 202a-202b onto points in the image planes 912 of viewpoint-matched virtual cameras 910. This is another example of a first transformation between see-through camera viewpoints and viewpoint-matched virtual camera viewpoints that could be identified by the viewpoint-matched camera transformation identification function 410.

Figure 10A:
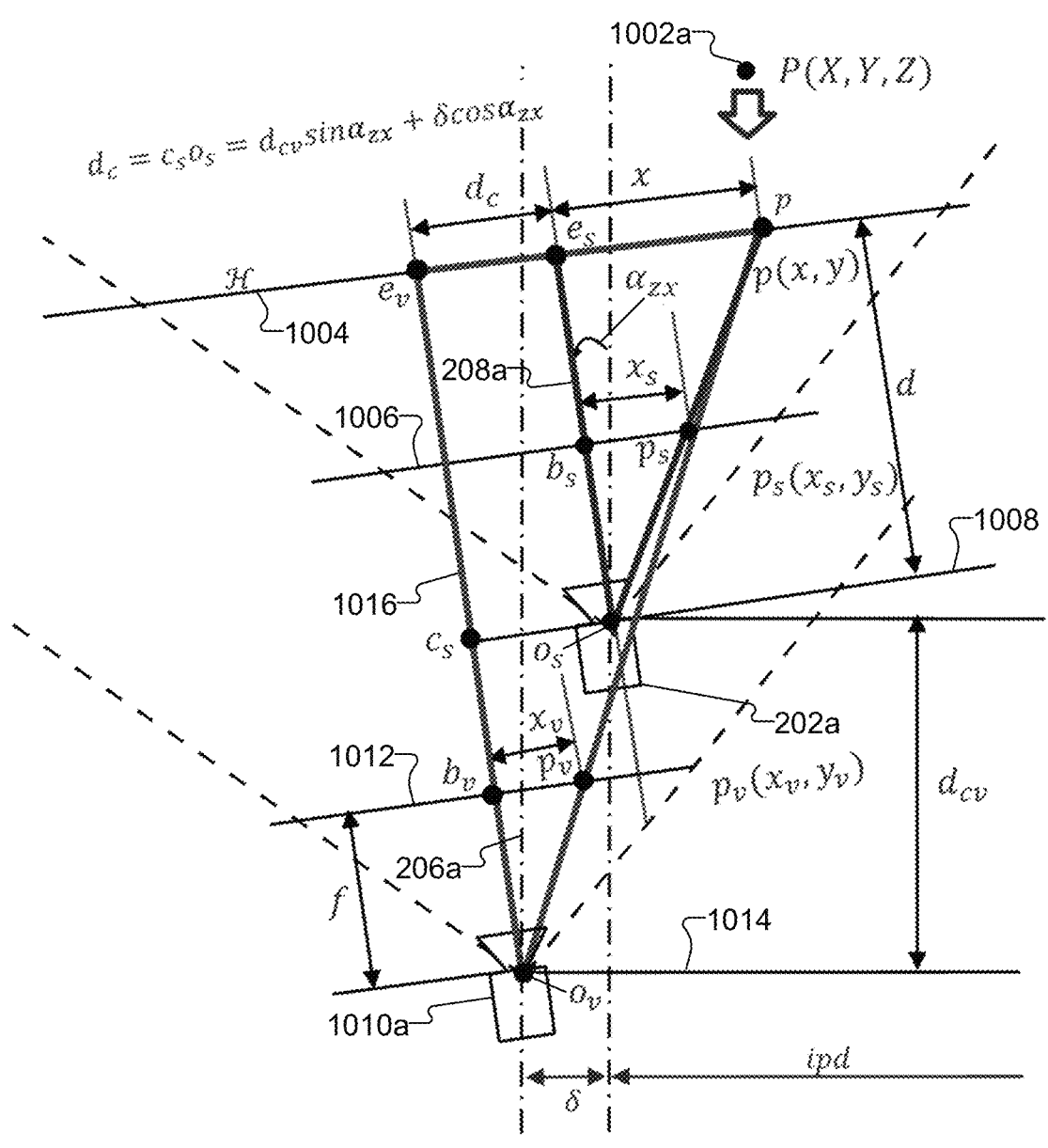
Figure 10B:
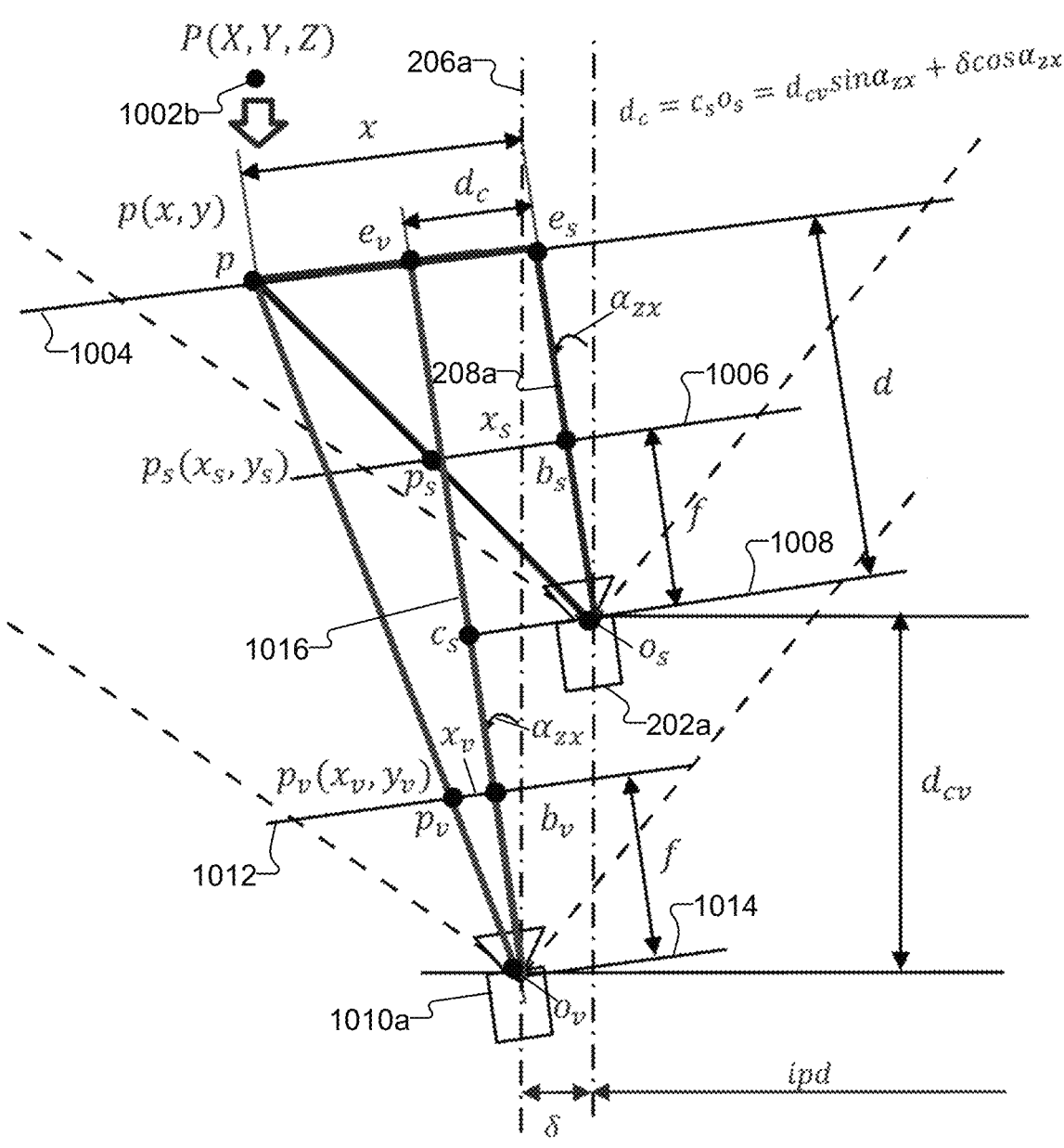
Figure 10C:
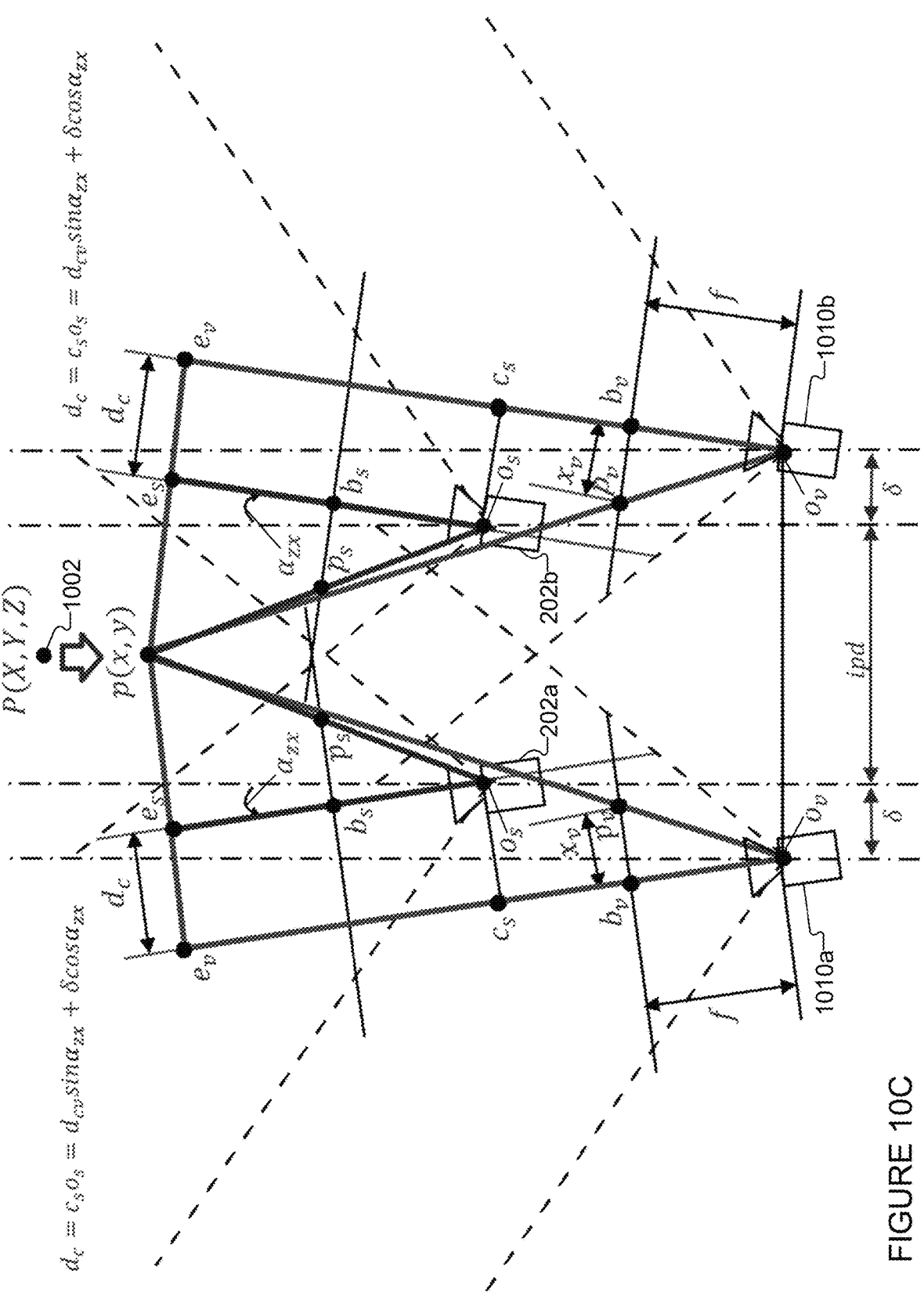

FIGS. 10A through 10C illustrate an example determination of a first transformation for see-through cameras 202a-202b having the configuration 200g shown in FIG. 2G. Note that the notations used with respect to FIGS. 10A through 10C are similar to the notations used above. As shown in FIG. 10A, the see-through camera 202a is imaging a scene that includes a point 1002, which is located inward from the perspective of the see-through camera 202a. Image planes 1004, 1006, 1012 and planes 1008, 1014 may be the same as or similar to the corresponding planes described above. A viewpoint-matched virtual camera 1010a is defined here, where the viewpoint-matched virtual camera 1010a is located where the user's left eye 204a is expected to be and has the same orientation as the corresponding see-through camera 202a. The viewpoint-matched virtual camera 1010a has an optical axis 1016. The see-through camera 202a is offset from the viewpoint-matched virtual camera 1010a by a distance $\delta$ and is angled outward at an angle $\alpha_{zx}$.

The 3D scene being imaged can be projected onto the projection plane $\mathcal{H}$ (the image plane 1004) as follows.

$$p(x,y) = \mathcal{H}(P(X,Y,Z))$$

A relationship between the projection plane $\mathcal{H}$ and the see-through plane (the image plane 1006) can be defined based on $\Delta o_s e_s p$ and $\Delta o_s b_s p_s$ as follows.

$$\frac{x}{x_s} = \frac{d}{f}$$

A relationship between the projection plane $\mathcal{H}$ and the viewpoint-matched frame (the image plane 1012) can be defined based on $\Delta o e_v p$ and $\Delta o_v b_v p_v$ as follows.

$$\frac{x + d_{cv}\sin\alpha_{zx} + \delta\cos\alpha_{zx}}{x_v} = \frac{d + d_{cv}\cos\alpha_{zx}}{f}$$

A mapping between $x_v$ and $x_s$ can be defined as follows $$x_v = \frac{dx_s + f(d_{cv}\sin\alpha_{zx} + \delta\cos\alpha_{zx})}{d + d_{cv}\cos\alpha_{zx}}$$

A mapping between $y_v$ and $y_s$ can be defined as follows.

$$y_v = \frac{dy_s + f(d_{cv}\sin\alpha_{zx} + \delta\cos\alpha_{zx})}{d + d_{cv}\cos\alpha_{zx}}$$

As shown in FIG. 10B, the see-through camera 202a is again angled outward and is not positioned on the forward axis 206a. A scene is being imaged that includes a point 1002b, which is located outward from the perspective of the see-through camera 202a. Using the same notations as above, the 3D scene being imaged can be projected onto the projection plane $\mathcal{H}$ (the image plane 1004) as follows.

$$p(x,y) = \mathcal{H}(P(X,Y,Z))$$

A relationship between the projection plane $\mathcal{H}$ and the see-through plane (the image plane 1006) can be defined based on $\Delta o_s e_s p$ and $\Delta o_s b_s p_s$ as follows.

$$\frac{x}{x_s} = \frac{d}{f}$$

A relationship between the projection plane $\mathcal{H}$ and the viewpoint-matched frame (the image plane 1012) can be defined based on $\Delta o_v e_v p$ and $\Delta o_v b_v p_v$ as follows.

$$\frac{x - d_{cv}\sin\alpha_{zx} - \delta\cos\alpha_{zx}}{x_v} = \frac{d + d_{cv}\cos\alpha_{zx}}{f}$$

From this, mappings between the coordinates of the see-through camera 202a and the coordinates of the viewpoint-matched virtual camera 1010a can be determined as follows.

$$x_v = \frac{dx_s - fd_{cv}\sin\alpha_{zx}}{d + d_{cv}\cos\alpha_{zx}}$$

$$y_v = \frac{dy_s - fd_{cv}\sin\alpha_{zx}}{d + d_{cv}\cos\alpha_{zx}}$$

FIG. 10C illustrates how the approach shown in FIG. 10A can be used in both see-through cameras 202a-202b with an inward point 1002. Using the equations defined above, for the left see-through camera 202a in FIG. 10C, the following transformation can be obtained.

$$\begin{cases} x_{v\_left} = \dfrac{dx_{s\_left} + f(d_{cv}\sin\alpha_{zx} + \delta\cos\alpha_{zx})}{d + d_{cv}\cos\alpha_{zx}} \\ y_{v\_left} = \dfrac{dy_{s\_left} + f(d_{cv}\sin\alpha_{zx} + \delta\cos\alpha_{zx})}{d + d_{cv}\cos\alpha_{zx}} \end{cases}$$

For the right see-through camera 202b in FIG. 10A, the following transformation can be obtained.

$$\begin{cases} x_{v\_right} = \dfrac{dx_{s\_right} + f(d_{cv}\sin\alpha_{zx} + \delta\cos\alpha_{zx})}{d + d_{cv}\cos\alpha_{zx}} \\ y_{v\_right} = \dfrac{dy_{s\_right} + f(d_{cv}\sin\alpha_{zx} + \delta\cos\alpha_{zx})}{d + d_{cv}\cos\alpha_{zx}} \end{cases}$$

Note that if the point 1002 is located outward from the perspective of one of the see-through cameras 202a or 202b, the numerators in one of the two preceding equations would involve subtraction rather than addition pursuant to the equations defined above for FIG. 10B.

These two transformations can therefore be used to define a first transformation that maps points from the image planes 1006 of the see-through cameras 202a-202b onto points in the image planes 1012 of viewpoint-matched virtual cameras 1010a-1010b. This is a final example of a first transformation between see-through camera viewpoints and viewpoint-matched virtual camera viewpoints that could be identified by the viewpoint-matched camera transformation identification function 410.

Figure 11:
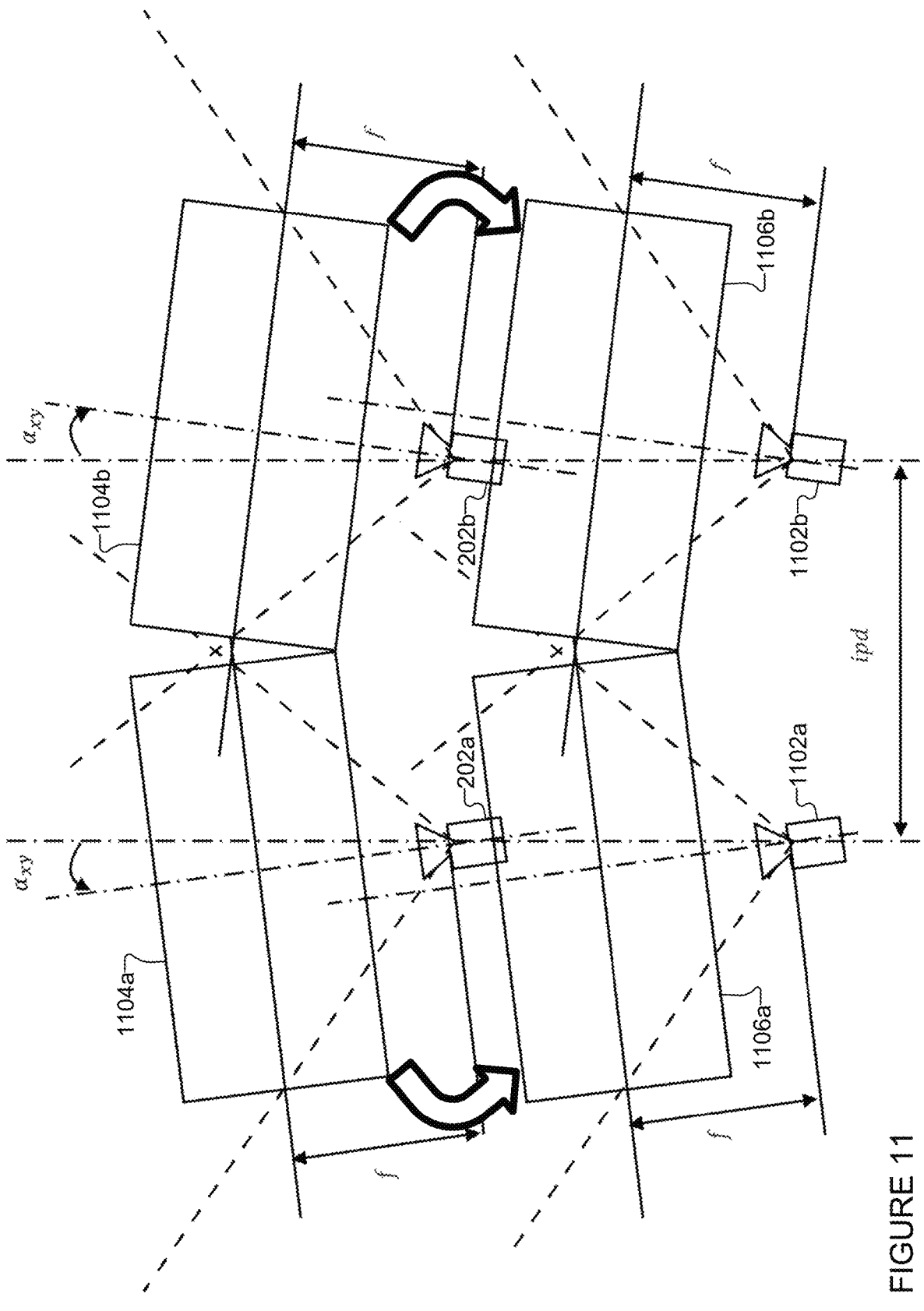
FIG. 11 illustrates an example of how a determined first transformation may be used as part of a passthrough transformation in accordance with this disclosure.

FIG. 11 illustrates an example of how a determined first transformation may be used as part of a passthrough transformation in accordance with this disclosure. As shown in FIG. 11, the see-through cameras 202a-202b can be used to capture see-through images within corresponding see-through image frames 1104a-1104b. The first transformation determined by the viewpoint-matched camera transformation identification function 410 based on the specific configuration of the see-through cameras 202a-202b can be used to convert the see-through image frames 1104a-1104b into corresponding viewpoint-matched virtual camera image frames 1106a-1106b. As described below, a rectification of the viewpoint-matched virtual camera image frames 1106a-1106b may subsequently be performed in order to convert the viewpoint-matched virtual camera image frames 1106a-1106b into virtual rendering camera image frames.

Although FIGS. 5A through 11 illustrate examples of determinations of a first transformation for various configurations of see-through cameras 202a-202b and related details, various changes may be made to FIGS. 5A through 11. For example, specific configurations of see-through cameras 202a-202b are described here along with specific transformations that may be used with those configurations. However, the see-through cameras 202a-202b could have other configurations not shown here, and the transformations used with those configurations may be derived in the same or similar manner as described above.

FIGS. 12 through 16 illustrate example rectifications of viewpoint-matched virtual image pairs as part of a pass-through transformation in accordance with this disclosure. More specifically, FIGS. 12 through 16 illustrate example rectifications that may be identified by the alignment function 412 for the various configurations 200b-200g of see-through cameras 202a-202b described above. In the following discussion, it is assumed that the see-through cameras 202a-202b are angled outward (such as in FIG. 2B or 2G) when discussing FIGS. 12 through 14 and angled downward (such as in FIG. 2C or 2D) when discussing FIGS. 15 and 16.

Figure 12:
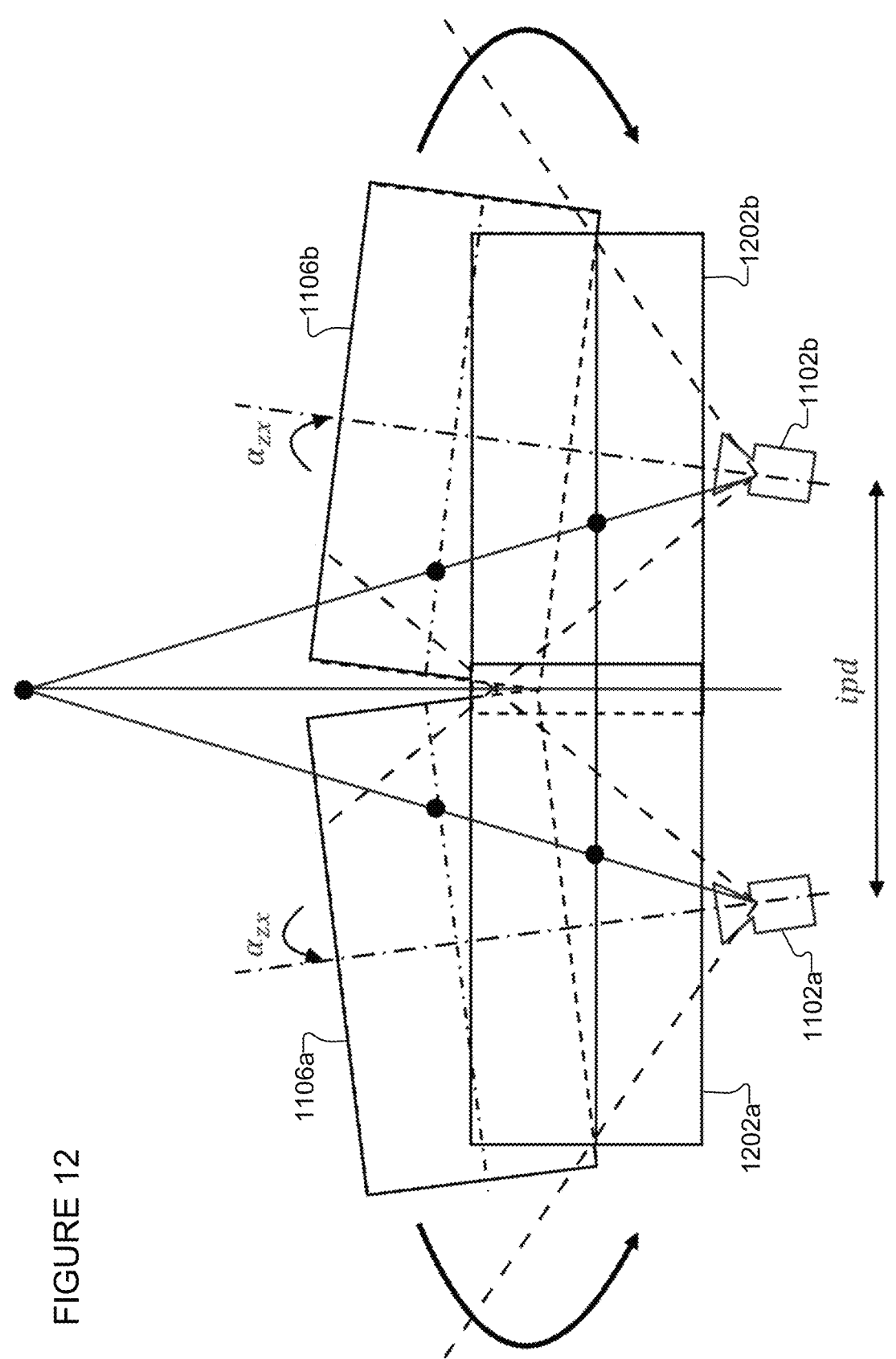
FIGS. 12 through 16 illustrate example rectifications of viewpoint-matched virtual image pairs as part of a passthrough transformation in accordance with this disclosure.

As shown in FIG. 12, the first transformation can be used to convert see-through image frames into corresponding viewpoint-matched virtual camera image frames 1106a-1106b. However, viewpoint-matched virtual cameras 1102a-1102b (which could represent any of the viewpoint-matched virtual cameras 510a-510b, 610, 710, 810, 910, 1010a-1010b discussed above) that are defined have the same orientation as their corresponding see-through cameras 202a-202b. When the see-through cameras 202a-202b are angled relative to the forward axes 206a-206b, the viewpoint-matched virtual cameras 1102a-1102b are also angled relative to the forward axes 206a-206b. In order to present rendered virtual images to a user, rectification is performed to convert the viewpoint-matched virtual camera image frames 1106a-1106b into virtual rendering camera image frames 1202a-1202b, which share a common image plane. This allows for the generation of "stereo" virtual image pairs that can be presented to the user. In a stereo image pair, epipolar lines of left and right images are colinear.

As noted above, each viewpoint-matched virtual camera 1102a-1102b is assumed to be located at the expected position of a user's eye 204a-204b, and the same is true for each virtual rendering camera. Since each viewpoint-matched virtual camera 1102a-1102b and its associated virtual rendering camera are assumed to be located at the same point and may only have different orientations, rectification can be performed in the following manner to rectify the viewpoint-matched virtual camera image frames 1106a-1106b and generate the virtual rendering camera image frames 1202a-1202b.

Figure 13:
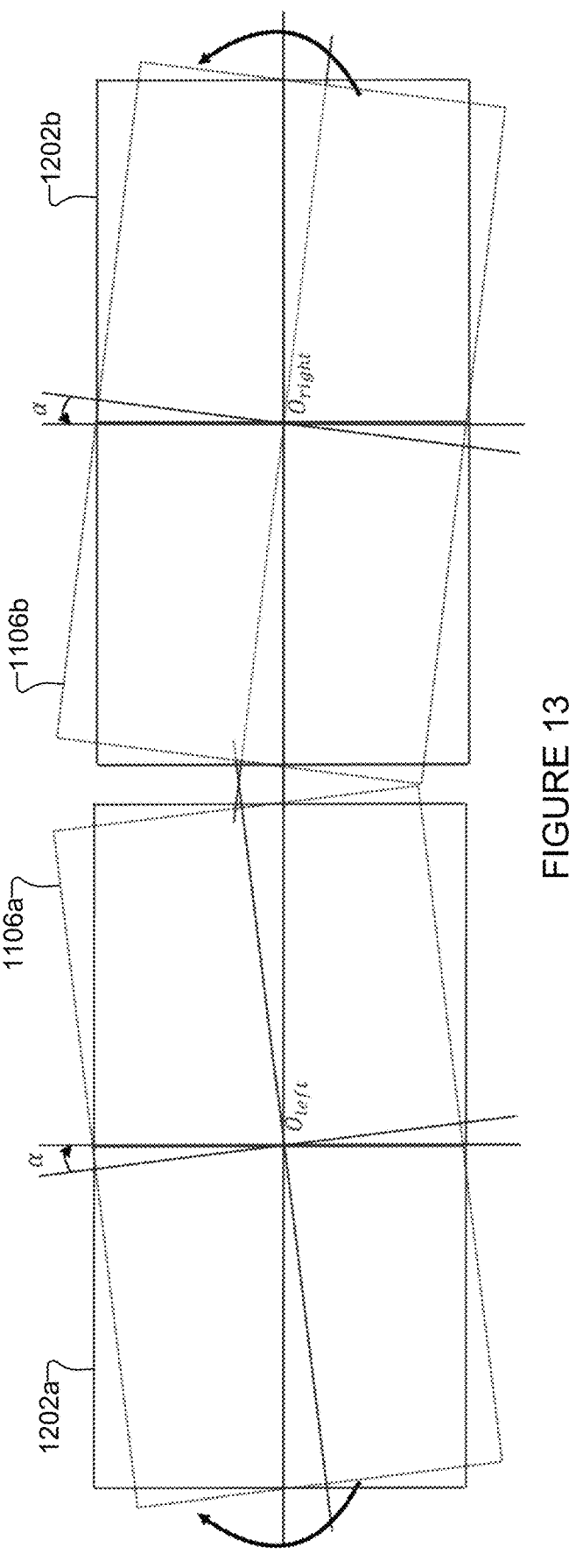

As shown in FIG. 13, because the viewpoint-matched virtual cameras 1102a-1102b share common points with their corresponding virtual rendering cameras, rectification can be performed via rotation. Thus, for example, the viewpoint-matched virtual camera image frame 1106a can be rotated about its center $O_{left}$ to obtain the virtual rendering camera image frame 1202a, and the viewpoint-matched virtual camera image frame 1106b can be rotated about its center Ole to obtain the virtual rendering camera image frame 1202b. As a result, viewpoint-matched virtual camera image frames 1106a-1106b may only need to be rotated in order to form stereo virtual images.

Figure 14:
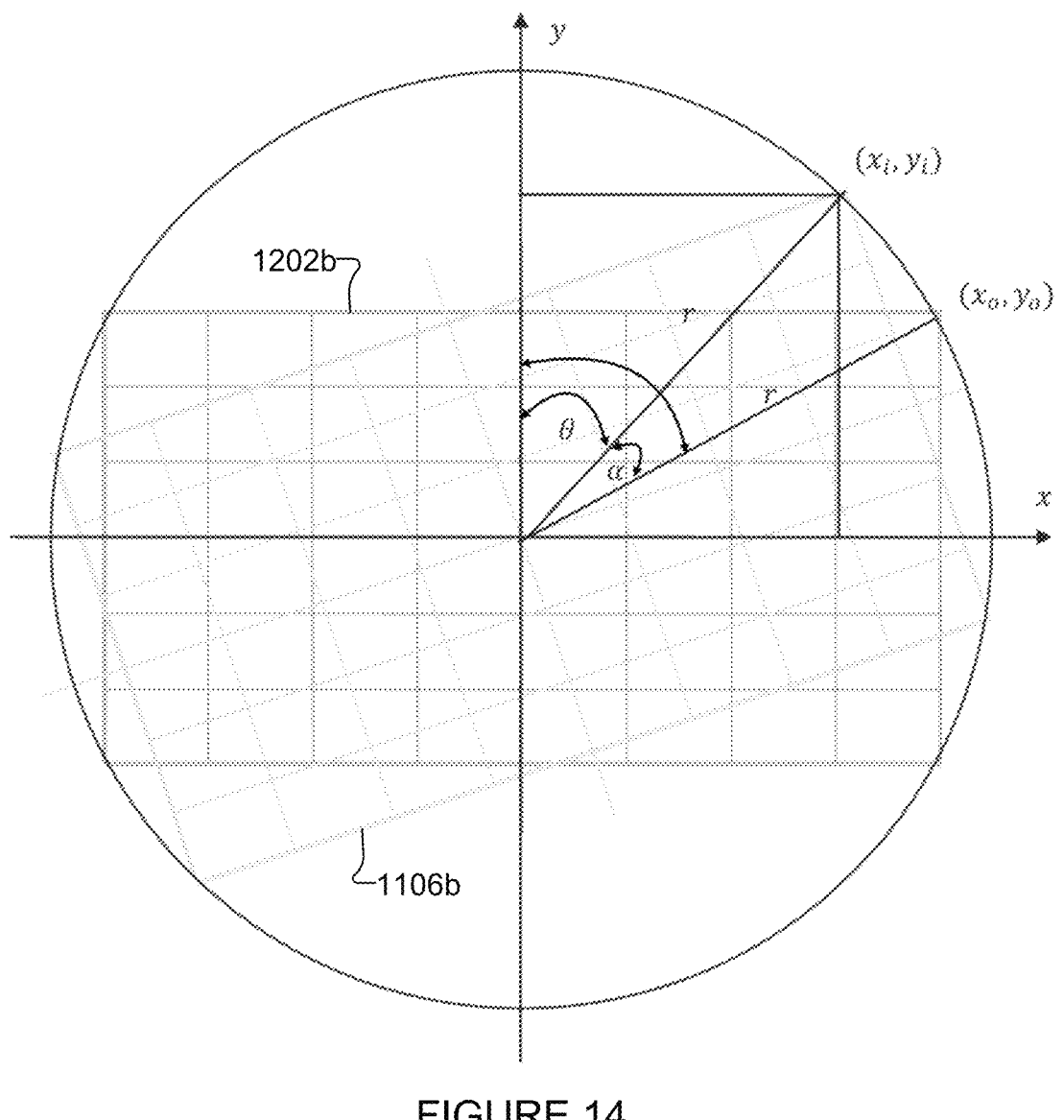

One technique for performing this rotation is shown in FIG. 14, in which $(x_i, y_i)$ represents a point of the viewpoint-matched virtual camera image frame 1106b and $(x_o, y_o)$ represents a corresponding point of the virtual rendering camera image frame 1202b. Based on the angles $\theta$ and $\alpha$ and the radius r shown here, the following relationship can be defined.

$$\begin{cases} \tan(\theta) = \dfrac{x_i}{y_i} \\ r = \sqrt{x_i^2 + y_i^2} \end{cases}$$

$$\begin{cases} x_o = r\sin(\theta + \alpha) \\ y_o = r\cos(\theta + \alpha) \end{cases}$$

This rotation is one example of a rectification between viewpoint-matched virtual camera image frames 1106a-1106b and virtual rendering camera image frames 1202a-1202b that could be identified by the alignment function 412.

Figures 15, 16:
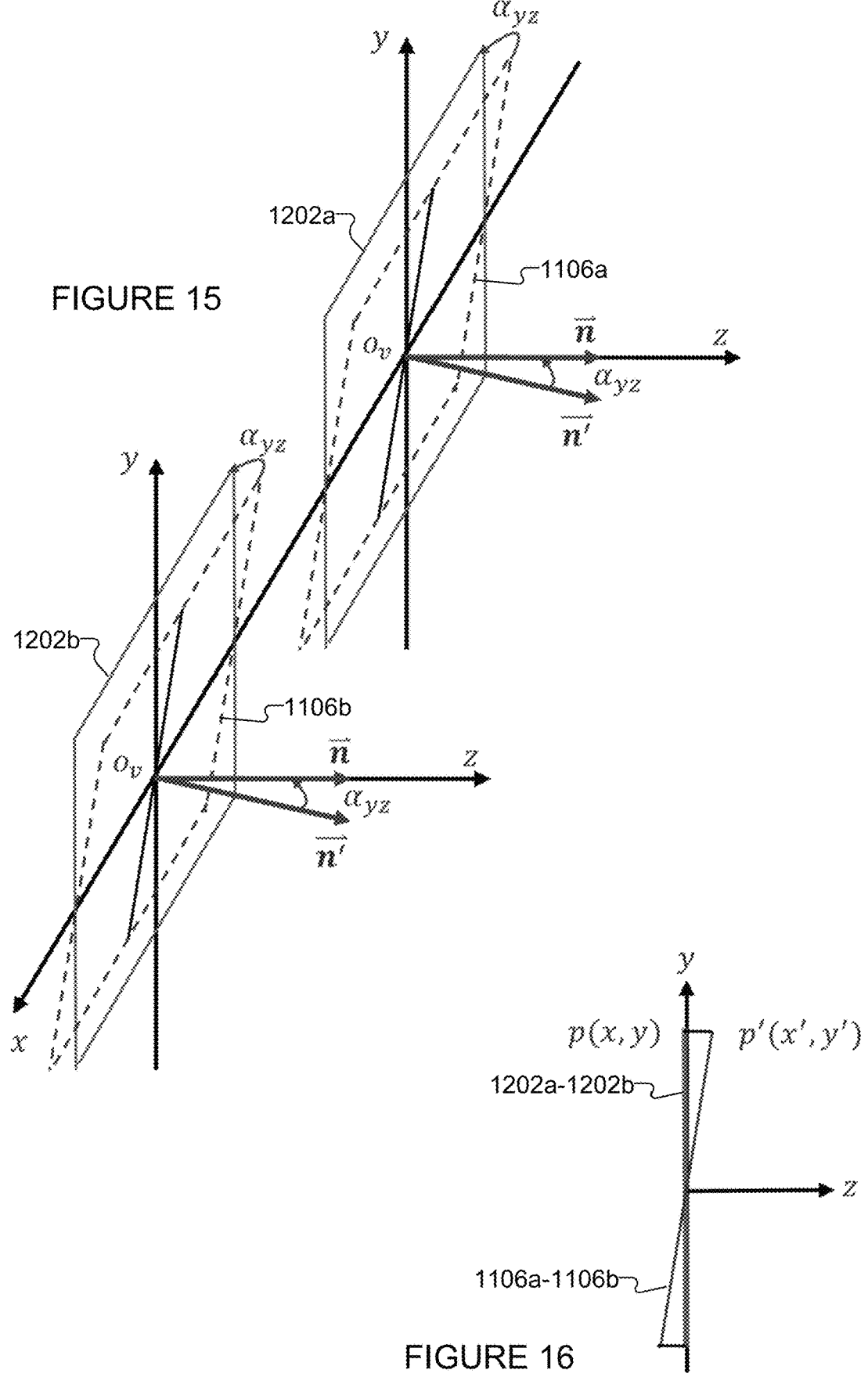

As shown in FIG. 15, when the see-through cameras 202a-202b are angled downward, rotation can again be used to perform rectification. In this example, the relationship between each viewpoint-matched virtual camera image frame 1106a-1106b and its virtual rendering camera image frame 1202a-1202b can be seen. Each viewpoint-matched virtual camera image frame 1106a-1106b has a normal vector $\vec{n}$, and each virtual rendering camera image frame 1202a-1202b has a normal vector $\vec{n'}$. Rotation can be used to rotate the viewpoint matched virtual camera image frames 1106a-1106b so that their normal vectors $\vec{n}$ match the normal vectors $\vec{n'}$, thereby creating the virtual rendering camera image frames 1202a-1202b. A side view of this rotation is shown in FIG. 16, where the rotation moves each point p'(x', y') to a corresponding point p(x, y). In some cases, this rotation may be performed using the following relationship.

$$\begin{cases} y = y'\cos\alpha_{yz} \\ x = x' \end{cases}$$

This rotation is another example of a rectification between viewpoint-matched virtual camera image frames 1106a-1106b and virtual rendering camera image frames 1202a-1202b that could be identified by the alignment function 412.

Although FIGS. 12 through 16 illustrate examples of rectifications of viewpoint-matched virtual image pairs as part of a passthrough transformation, various changes may be made to FIGS. 12 through 16. For example, FIGS. 12 through 16 assume that the see-through cameras 202a-202b are angled in specific directions, the see-through cameras 202a-202b may be angled in other directions, and the rectifications used with those configurations may be derived in the same or similar manner as described above.

FIGS. 17 through 21 illustrate example determinations of a second transformation for various configurations of see-through cameras in a VST XR device in accordance with this disclosure. More specifically, FIGS. 17 through 21 illustrate how example second transformations may be identified by the FOV calibration and principal point matching function 414 for the various configurations 200b-200g of see-through cameras 202a-202b described above.

Figure 17:
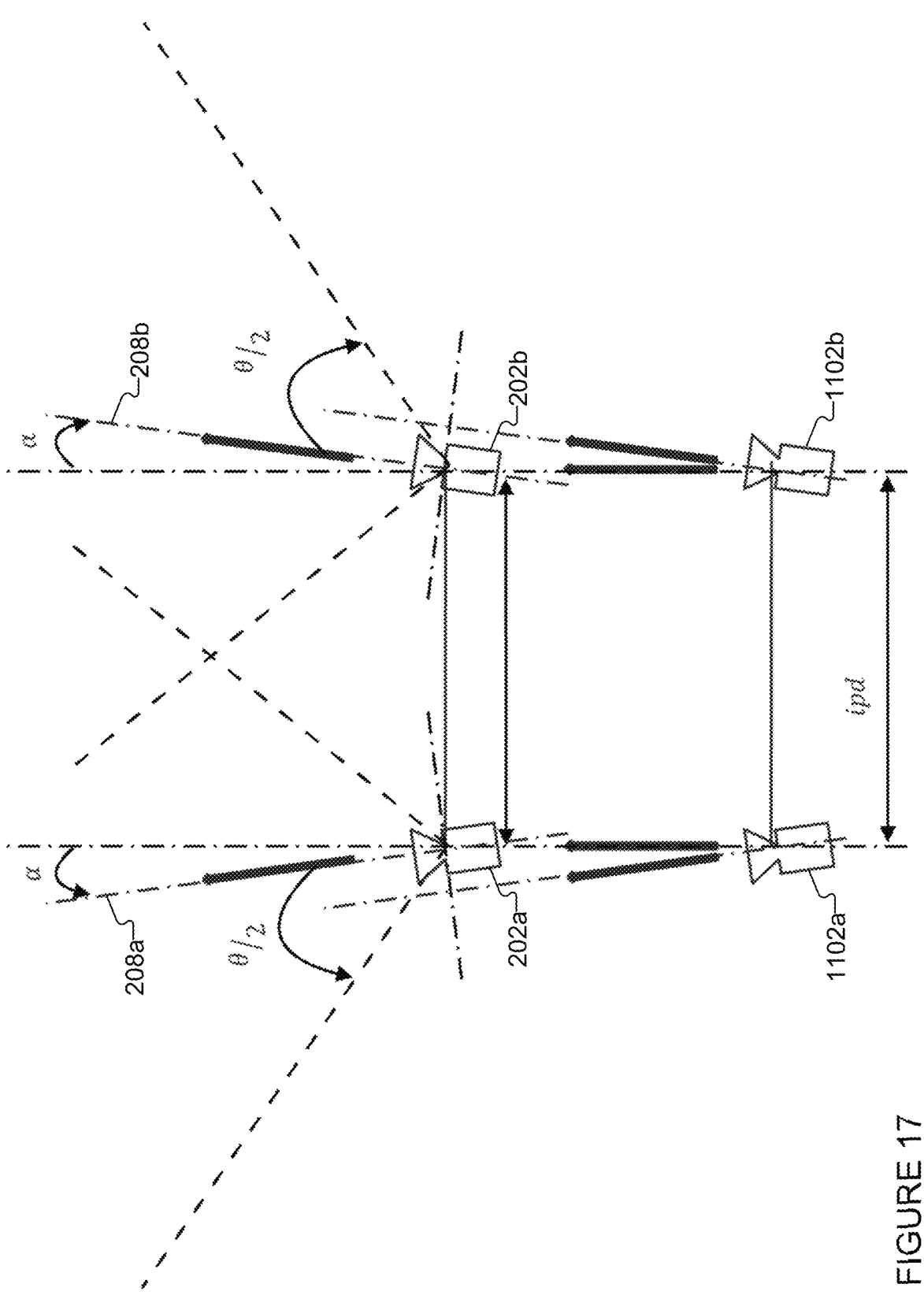
FIGS. 17 through 21 illustrate example determinations of a second transformation for various configurations of see-through cameras in a VST XR device in accordance with this disclosure.
Figure 18:
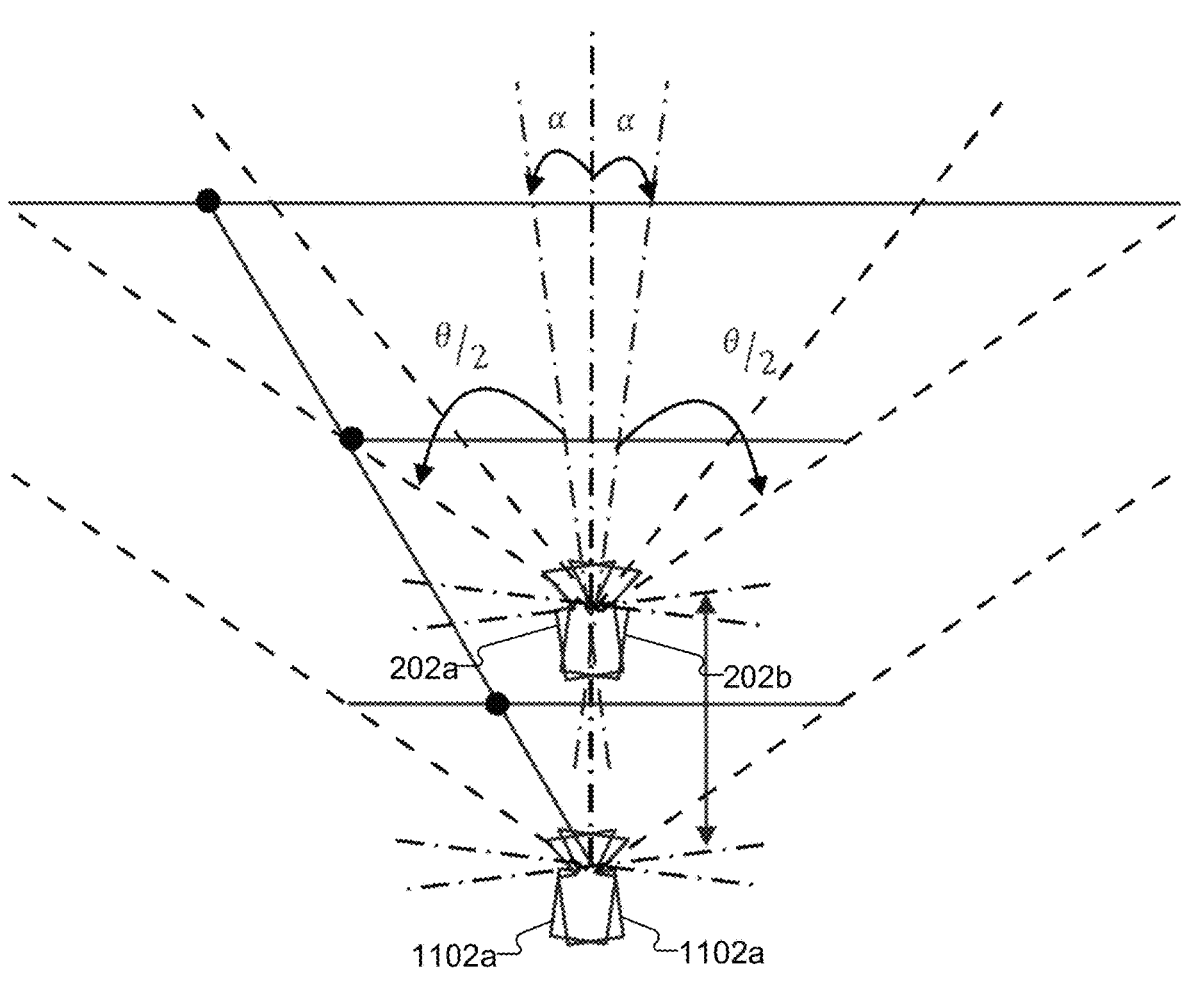

As shown in FIG. 17, the field of view of each individual see-through camera 202a-202b is defined as θ, where half (θ/2) of the field of view is available on each side of the optical axis 208a-208b of the see-through camera 202a-202b. The see-through cameras 202a-202b and the associated viewpoint-matched virtual cameras 1102a-1102b may or may not be rotated, depending on the configuration of see-through cameras 202a-202b being used. In this example, the see-through cameras 202a-202b and the viewpoint-matched virtual cameras 1102a-1102b are rotated outward at an angle α. As shown in FIG. 18, overlaying the see-through cameras 202a-202b and overlaying the associated viewpoint-matched virtual cameras 1102a-1102b allows for the identification of the combined field of view for both see-through cameras 202a-202b (which can also match the combined field of view for both viewpoint-matched virtual cameras 1102a-1102b). In some cases, the combined field of view for both see-through cameras 202a-202b can be determined as follows.

$$FOV = \frac{\theta}{2} + \alpha + \alpha + \frac{\theta}{2} = \theta + 2\alpha$$

Note that a larger rotation angle α enables a larger field of view, but it comes at the expense of reduced overlap between the left and right see-through cameras 202a-202b. Thus, the FOV calibration and principal point matching function 414 can identify the available field of view that can be achieved using the see-through cameras 202a-202b.

Figure 19:
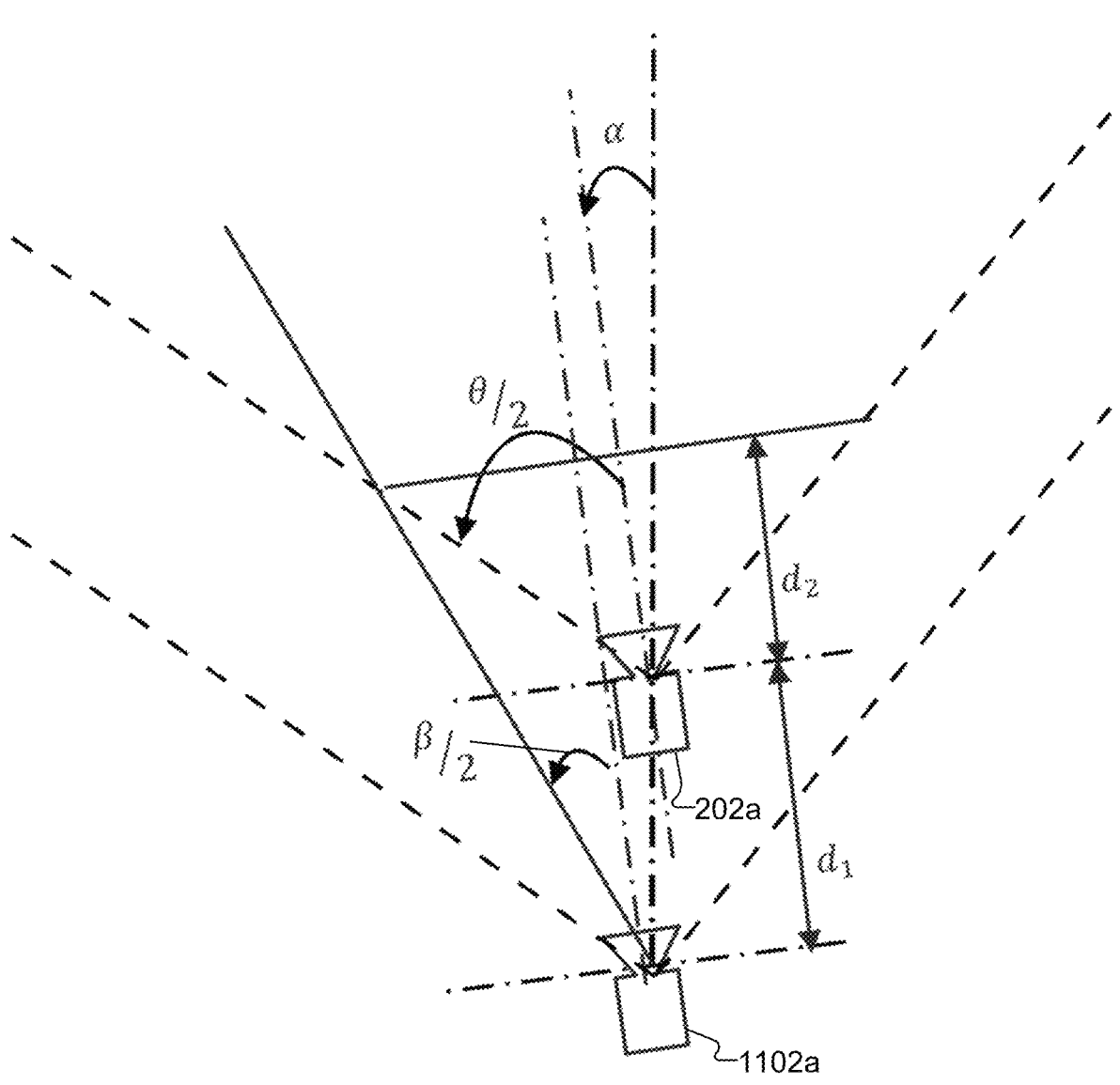

The FOV calibration and principal point matching function 414 can also identify a minimum field of view for each see-through camera 202a-202b. As shown in FIG. 19, $d_1$ represents the distance between the see-through camera 202 and the viewpoint-matched virtual camera 1102a, and $d_2$ represents the distance between the see-through camera 202 and an object in the scene. A relationship between the minimum camera field of view θ and the field of view β of the VST XR pipeline can be defined as follows.

$$\tan\frac{\beta}{2} = \frac{d_2}{d_1 + d_2}\tan\frac{\theta}{2}$$

Figure 20:
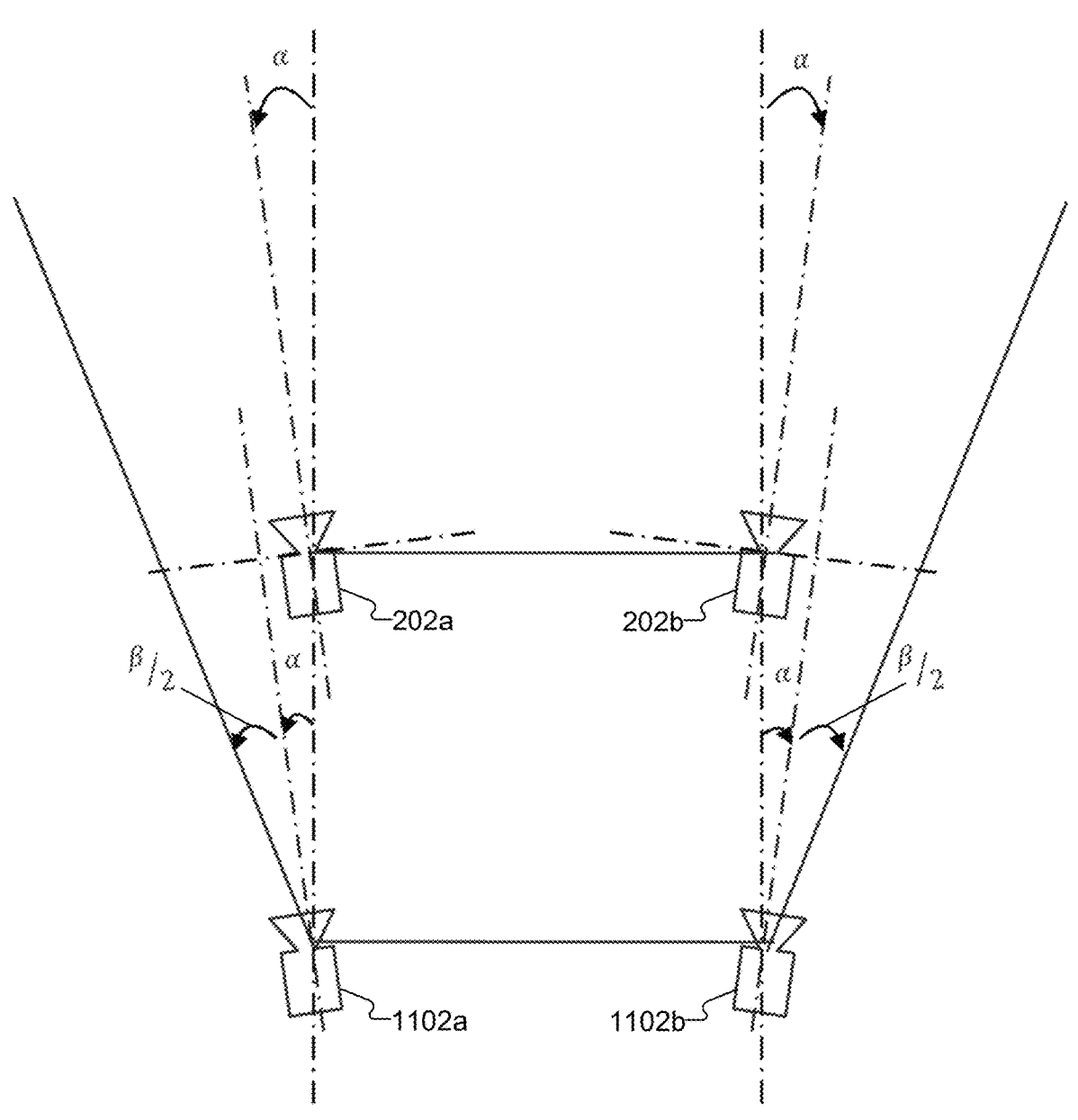

FIG. 20 illustrates the combined field of view of the see-through cameras 202a-202b, where the combined field of view may be defined as follows.

$$FOV = \beta + 2\alpha$$

These values allow the FOV calibration and principal point matching function 414 to determine suitable fields of view to be used by the see-through cameras 202a-202b when generating virtual images for presentation to a user.

Figure 21:
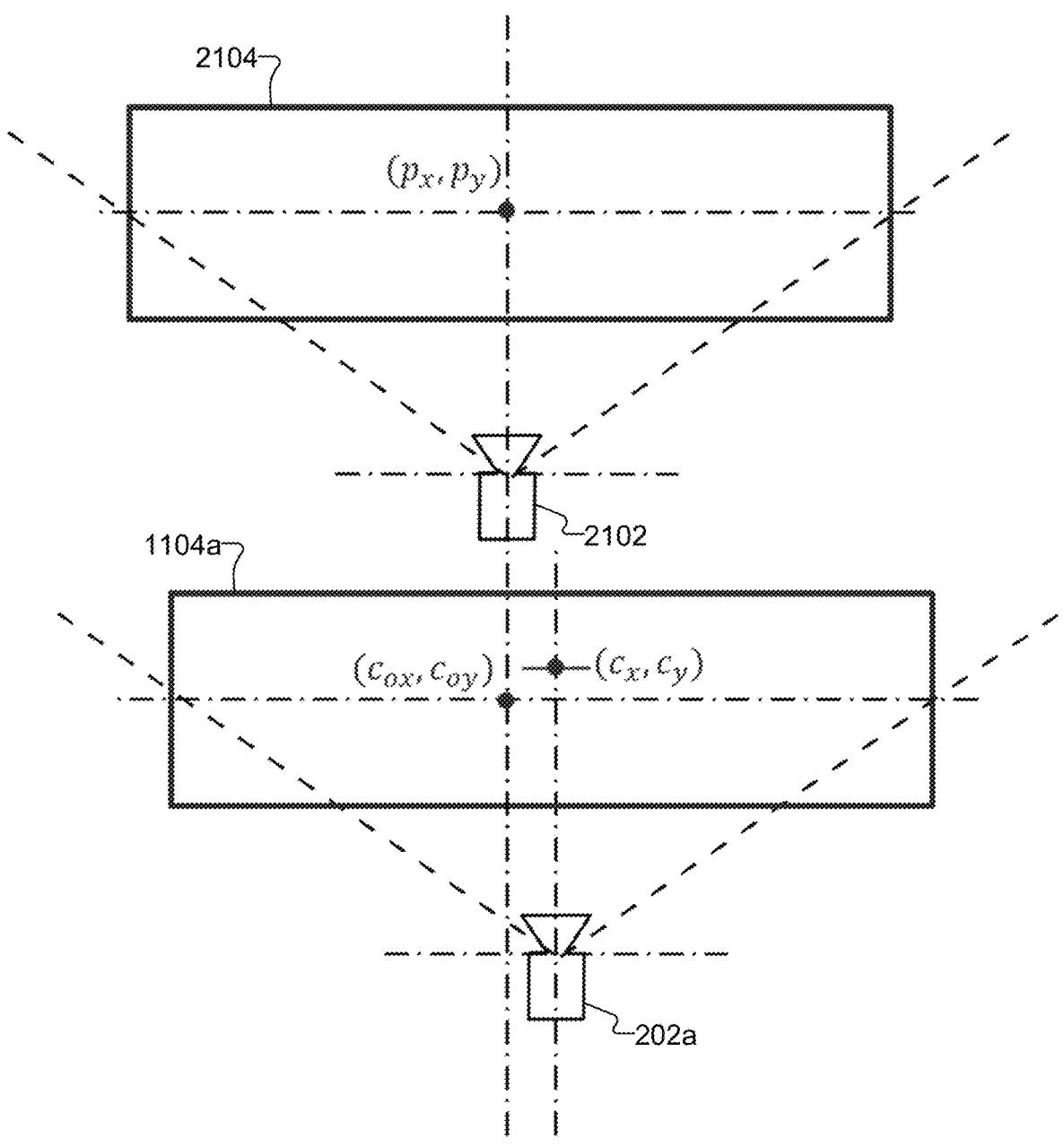

In addition, the FOV calibration and principal point matching function 414 performs principal point matching between the see-through cameras 202a-202b and at least one display panel 302 (or portions there). As shown in FIG. 21, the see-through camera 202a captures a see-through image within the see-through image frame 1104a, and a virtual rendering camera 2102 is assumed to capture a virtual image frame 2104. The virtual image frame 2104 is actually generated by transforming the see-through image, such as by using the first transformation and optionally rectification as described above.

However, see-through camera lenses often have distortion, so the principal point $(c_x, c_y)$ of the see-through camera 202a may not necessarily overlap the desired center $(c_{ox}, c_{oy})$ the see-through image frame 1104a. The desired center $(c_{ox}, c_{oy})$ the see-through image frame 1104a here is aligned with a principal point $(p_x, p_y)$ of the virtual image frame 2104, which also represents a principal point of the associated display panel 302 (or portion thereof). The same condition can also be true for the other see-through camera 202b. Mismatches can therefore exist between the principal points of the see-through cameras 202a-202b and the principal points of the display panel(s) 302. Matching the principal points of the see-through cameras 202a-202b with the principal points of the display panel(s) 302 can be useful for various reasons, such as to support subsequent correction of display lens geometric distortions and chromatic aberrations.

The principal point ($c_x$, $c_y$) of each see-through camera 202a-202b can often be obtained using calibration data, such as from the camera configuration and passthrough transformation operation 402. For example, intrinsic parameters of each see-through camera 202a-202b can often be defined using a camera matrix, such as one having the following form.

$$K = \begin{pmatrix} f_x & 0 & c_x \\ 0 & f_y & c_y \\ 0 & 0 & 1 \end{pmatrix}$$

Here, $c_x$ and $c_y$ define the location of the principal point of a see-through camera 202a-202b, and $f_x$ and $f_y$ define the focal length of the see-through camera 202a-202b.

A second transformation can be defined to move the principal point ($c_x$, $c_y$) of each see-through camera 202a-202b to the associated center ($c_{ox}$, $c_{oy}$) of its frame, thereby matching the principal points of the see-through cameras 202a-202b to the corresponding principal points of the display panel(s) 302. In some cases, this second transformation may be expressed as follows.

$$F_o(x, y) = \begin{pmatrix} 1 & 0 & -c_x \\ 0 & 1 & -c_y \\ 0 & 0 & 1 \end{pmatrix} F_i(x, y)$$

Here, $F_o(x, y)$ represents a transformed image frame, and $F_i(x, y)$ represents an original image frame. Thus, a suitable transform can be applied for each see-through camera 202a-202b to account for any principal point mismatches. Note that this second transformation may be applied to the see-through image frames captured by the see-through cameras 202a-202b or to the associated viewpoint-matched and rectified versions of the virtual images generated as discussed above.

Although FIGS. 17 through 21 illustrate examples of determinations of a second transformation for various configurations of see-through cameras in a VST XR device, various changes may be made to FIGS. 17 through 21. For example, the second transformation may be used to correct for any other misalignments between principal points of the see-through cameras 202a-202b and the display panel(s) 302.

Figure 22:
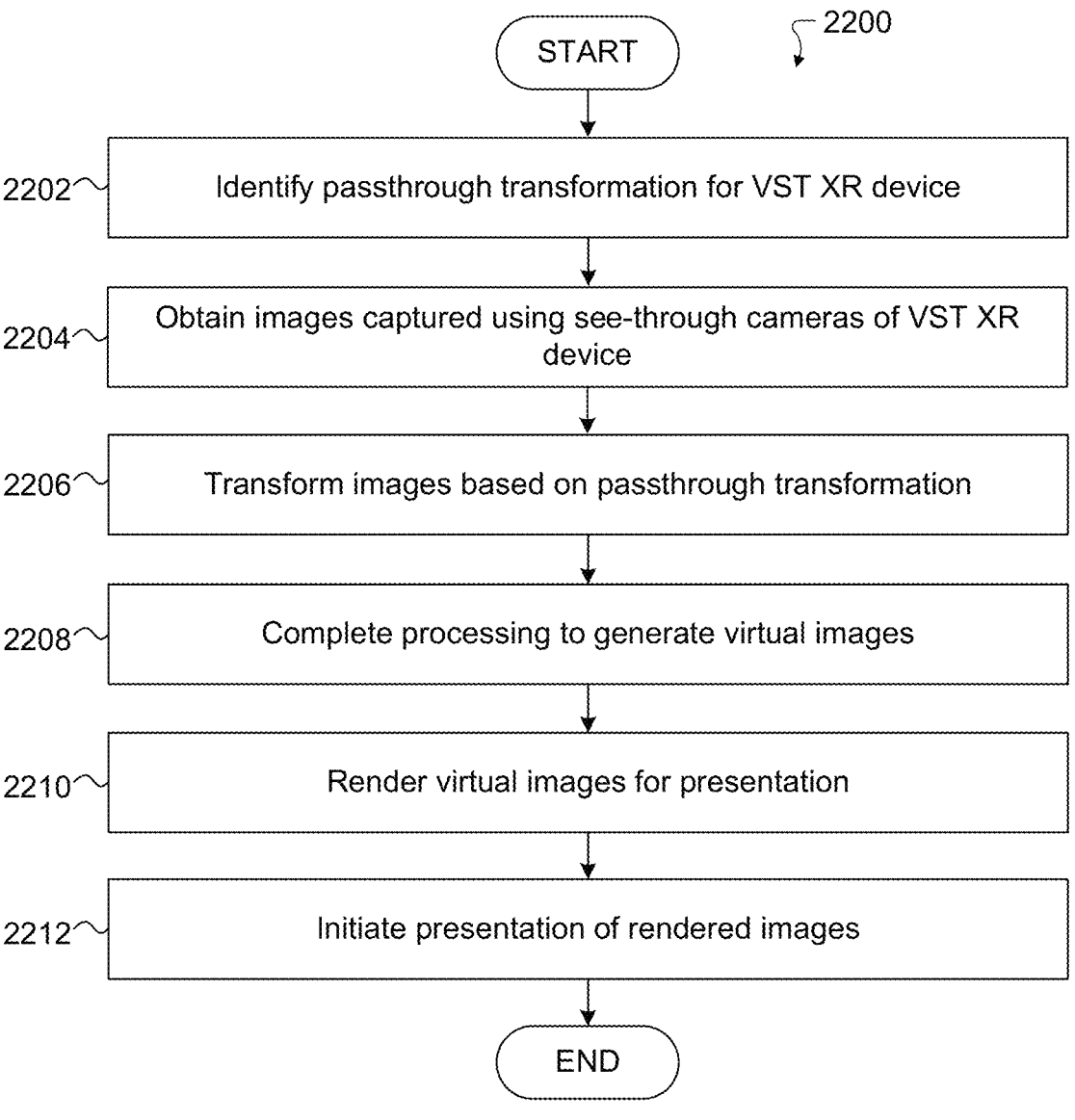
FIG. 22 illustrates an example method for final view generation using offset and/or angled see-through cameras in VST XR in accordance with this disclosure.

FIG. 22 illustrates an example method 2200 for final view generation using offset and/or angled see-through cameras in VST XR in accordance with this disclosure. For ease of explanation, the method 2200 shown in FIG. 22 is described as being performed by the electronic device 101 in the network configuration 100 of FIG. 1, where the electronic device 101 can use the architecture 400 shown in FIG. 4. However, the method 2200 shown in FIG. 22 could be performed using any other suitable device(s) and architecture(s) and in any other suitable system(s).

As shown in FIG. 22, a passthrough transformation associated with a VST XR device is identified at step 2202. This could include, for example, the processor 120 of the electronic device 101 generating a passthrough transformation by performing the camera configuration and passthrough transformation operation 402 or by retrieving a passthrough transformation that was previously generated by the camera configuration and passthrough transformation operation 402. The passthrough transformation is based on (i) a first transformation between see-through camera viewpoints and viewpoint-matched virtual camera viewpoints and (ii) a second transformation that aligns principal points of see-through cameras 202a-202b and principal points of one or more display panels 302. Depending on whether the see-through cameras 202a-202b are rotated relative to forward axes 206a-206b of the VST XR device, the passthrough transformation may also be based on (iii) a rectification to map image frames of viewpoint-matched virtual cameras 1102a-1102b to image frames of virtual rendering cameras 2102.

Images captured using the see-through cameras of the VST XR device are obtained at step 2204. This may include, for example, the processor 120 of the electronic device 101 obtaining see-through image frames 206a-206 captured using the see-through cameras 204a-204b of the electronic device 101. Each image is transformed by applying the passthrough transformation to the image at step 2206. This may include, for example, the processor 120 of the electronic device 101 applying the passthrough transformation to account for the offset of the associated see-through camera 206a-206b from the associated forward axis 206a-206b and/or the angle of the associated see-through camera 206a-206b with respect to the associated forward axis 206a-206b.

Processing of the images is completed at step 2208. This may include, for example, the processor 120 of the electronic device 101 performing any desired post-processing operations, such as correcting for display lens geometric distortions and chromatic aberrations. This leads to the generation of final virtual images. Each final virtual image can be rendered at step 2210, and presentation of each rendered image can be initiated at step 2212. This may include, for example, the processor 120 of the electronic device 101 rendering the final virtual images for presentation on the one or more display panels 302.

Although FIG. 22 illustrates one example of a method 2200 for final view generation using offset and/or angled see-through cameras in VST XR, various changes may be made to FIG. 22. For example, while shown as a series of steps, various steps in FIG. 22 may overlap, occur in parallel, occur in a different order, or occur any number of times (including zero times).

It should be noted that it is assumed above that the VST XR device includes one left see-through camera 202a and one right see-through camera 202b. However, it is possible to expand the functionality described above to support the use of multiple left see-through cameras 202a and multiple right see-through cameras 202b. For example, multiple passthrough transformations may be created in order to transform different see-through images captured by different left and right see-through cameras 202a-202b to the same virtual image frames. When multiple left virtual images and multiple right virtual images are generated, the left virtual images may be blended or otherwise combined in order to produce a final left virtual image, and the right virtual images may be blended or otherwise combined in order to produce a final right virtual image. This can be repeated any number of times to generate a sequence of left virtual images and right virtual images. There is also no requirement that the multiple left see-through cameras 202a have the same orientation or that the multiple right see-through cameras 202b have the same orientation. Each one of the multiple left see-through cameras 202*a* and the multiple right see-through cameras 202*b* may be independently offset from a forward axis and/or angled with respect to a forward axis.

It should also be noted that the functions described above can be implemented in an electronic device 101, 102, 104, server 106, or other device(s) in any suitable manner. For example, in some embodiments, at least some of the functions can be implemented or supported using one or more software applications or other software instructions that are executed by the processor 120 of the electronic device 101, 102, 104, server 106, or other device(s). In other embodiments, at least some of the functions can be implemented or supported using dedicated hardware components. In general, the functions described above can be performed using any suitable hardware or any suitable combination of hardware and software/firmware instructions. Also, the functions described above can be performed by a single device or by multiple devices.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
identifying a passthrough transformation associated with a video see-through (VST) extended reality (XR) device, the VST XR device comprising see-through cameras that are at least one of (i) offset from forward axes extending from expected locations of a user's eyes when using the VST XR device or (ii) rotated such that optical axes of the see-through cameras are angled relative to the forward axes;
obtaining images of a scene captured using the see-through cameras;
applying the passthrough transformation to the images in order to generate transformed images; and
displaying the transformed images on one or more display panels of the VST XR device;
wherein the passthrough transformation is based on (i) a first transformation between see-through camera viewpoints and viewpoint-matched virtual camera viewpoints and (ii) a second transformation that aligns principal points of the see-through cameras and principal points of the one or more display panels.

2. The method of claim 1, wherein the passthrough transformation is further based on (iii) a rectification to map image frames of viewpoint-matched virtual cameras to image frames of virtual rendering cameras.

3. The method of claim 1, wherein the transformed images provide a wider field of view than a field of view at the expected locations of the user's eyes.

4. The method of claim 1, wherein the optical axes of the see-through cameras are not parallel to each other.

5. The method of claim 1, wherein the first transformation is based on an interpupillary distance associated with the expected locations of the user's eyes.

6. The method of claim 1, wherein the see-through cameras are positioned above or below the forward axes.

7. The method of claim 1, wherein the optical axes of the see-through cameras are at least one of angled outward or angled downward relative to the forward axes.

8. A video see-through (VST) extended reality (XR) device comprising:
see-through cameras configured to capture images of a scene, wherein the see-through cameras are at least one of (i) offset from forward axes extending from expected locations of a user's eyes when using the VST XR device or (ii) rotated such that optical axes of the see-through cameras are angled relative to the forward axes;
one or more display panels; and
at least one processing device configured to:
identify a passthrough transformation associated with the VST XR device;
apply the passthrough transformation to the images in order to generate transformed images; and
initiate display of the transformed images on the one or more display panels;
wherein the passthrough transformation is based on (i) a first transformation between see-through camera viewpoints and viewpoint-matched virtual camera viewpoints and (ii) a second transformation that aligns principal points of the see-through cameras and principal points of the one or more display panels.

9. The VST XR device of claim 8, wherein the passthrough transformation is further based on (iii) a rectification to map image frames of viewpoint-matched virtual cameras to image frames of virtual rendering cameras.

10. The VST XR device of claim 8, wherein the transformed images provide a wider field of view than a field of view at the expected locations of the user's eyes.

11. The VST XR device of claim 8, wherein the optical axes of the see-through cameras are not parallel to each other.

12. The VST XR device of claim 8, wherein the first transformation is based on an interpupillary distance associated with the expected locations of the user's eyes.

13. The VST XR device of claim 8, wherein the see-through cameras are positioned above or below the forward axes.

14. The VST XR device of claim 8, wherein the optical axes of the see-through cameras are at least one of angled outward or angled downward relative to the forward axes.

15. A non-transitory machine readable medium containing instructions that when executed cause at least one processor of a video see-through (VST) extended reality (XR) device to:
identify a passthrough transformation associated with the VST XR device, the VST XR device comprising see-through cameras that are at least one of (i) offset from forward axes extending from expected locations of a user's eyes when using the VST XR device or (ii) rotated such that optical axes of the see-through cameras are angled relative to the forward axes;
obtain images of a scene captured using the see-through cameras;
apply the passthrough transformation to the images in order to generate transformed images; and
initiate display of the transformed images on one or more display panels of the VST XR device;
wherein the passthrough transformation is based on (i) a first transformation between see-through camera viewpoints and viewpoint-matched virtual camera viewpoints and (ii) a second transformation that aligns principal points of the see-through cameras and principal points of the one or more display panels.

16. The non-transitory machine readable medium of claim 15, wherein the passthrough transformation is further based on (iii) a rectification to map image frames of viewpoint-matched virtual cameras to image frames of virtual rendering cameras.

17. The non-transitory machine readable medium of claim 15, wherein the transformed images provide a wider field of view than a field of view at the expected locations of the user's eyes.

18. The non-transitory machine readable medium of claim 15, wherein the optical axes of the see-through cameras are not parallel to each other.

19. The non-transitory machine readable medium of claim 15, wherein the first transformation is based on an interpupillary distance associated with the expected locations of the user's eyes.

20. The non-transitory machine readable medium of claim 15, wherein at least one of:

the see-through cameras are positioned above or below the forward axes; or the optical axes of the see-through cameras are at least one of angled outward or angled downward relative to the forward axes.

* * * * *